United States Patent

Okazawa

(10) Patent No.: US 10,992,523 B2
(45) Date of Patent: Apr. 27, 2021

(54) INFORMATION PROCESSING APPARATUS, PERIPHERAL APPARATUS, CONTROL METHOD THEREOF, STORAGE MEDIUM, AND SYSTEM

(71) Applicant: CANON KABUSHIKI KAISHA, Tokyo (JP)

(72) Inventor: Takashi Okazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 248 days.

(21) Appl. No.: 15/961,926

(22) Filed: Apr. 25, 2018

(65) Prior Publication Data

US 2018/0316553 A1    Nov. 1, 2018

(30) Foreign Application Priority Data

May 1, 2017 (JP) .............................. JP2017-091399

(51) Int. Cl.
*G06F 15/16* (2006.01)
*H04L 12/24* (2006.01)
(Continued)

(52) U.S. Cl.
CPC ...... *H04L 41/0806* (2013.01); *H04L 41/0213* (2013.01); *H04L 61/2015* (2013.01);
(Continued)

(58) Field of Classification Search
CPC ............ H04L 41/0213; H04L 41/0806; H04L 41/0809; H04L 61/2015; H04L 61/2038; H04L 61/2092; H04L 63/20
(Continued)

(56) References Cited

U.S. PATENT DOCUMENTS

2006/0212730 A1* 9/2006 Senda ...................... G06F 1/32
                                                             713/300
2011/0191631 A1* 8/2011 Suzuki ..................... G06F 11/07
                                                              714/25

(Continued)

FOREIGN PATENT DOCUMENTS

| CN | 1666473 A | 9/2005 |
|----|-----------|--------|
| CN | 1918847 A | 2/2007 |

(Continued)

OTHER PUBLICATIONS

Office Action issued in Chinese Appln. No. 201810390685.3 dated Jan. 18, 2021.
(Continued)

*Primary Examiner* — Karen C Tang
(74) *Attorney, Agent, or Firm* — Rossi, Kimms & McDowell LLP

(57) ABSTRACT

An information processing apparatus according to this embodiment performs network setting of a peripheral apparatus having a plurality of communication interfaces. The
(Continued)

information processing apparatus is connected to the peripheral apparatus using a predetermined communication interface from among the plurality of communication interfaces, and sets the communication interfaces of the peripheral apparatus via the predetermined communication interface. An IP address used for connection during these network settings is determined using AutoIP, if the type of predetermined communication interface is a wired communication interface.

9 Claims, 30 Drawing Sheets

(51) Int. Cl.
    *H04L 29/12*     (2006.01)
    *H04L 29/06*     (2006.01)
    *G06F 15/173*     (2006.01)

(52) U.S. Cl.
    CPC ...... *H04L 61/2038* (2013.01); *H04L 61/2092* (2013.01); *H04L 63/20* (2013.01); *H04L 41/0809* (2013.01)

(58) Field of Classification Search
    USPC .......................................................... 709/231
    See application file for complete search history.

(56) References Cited

U.S. PATENT DOCUMENTS

| | | | |
|---|---|---|---|
| 2012/0151023 A1* | 6/2012 | Won | H04L 41/0843 709/222 |
| 2013/0036453 A1* | 2/2013 | Lyndersay | H04L 61/2015 726/3 |
| 2017/0180305 A1* | 6/2017 | Seine | H04L 61/2023 |

FOREIGN PATENT DOCUMENTS

| | | |
|---|---|---|
| CN | 102035657 A | 4/2011 |
| CN | 102546851 A | 7/2012 |
| CN | 105453641 A | 3/2016 |
| JP | 2007081890 A | 3/2007 |
| JP | 2007164680 A | 6/2007 |
| JP | 2011158971 A | 8/2011 |
| JP | 2012239120 A | 12/2012 |
| JP | 2015061100 A | 3/2015 |

OTHER PUBLICATIONS

Office Action issued in Japanese Appln. No. 2017-091399 dated Mar. 8, 2021.

* cited by examiner

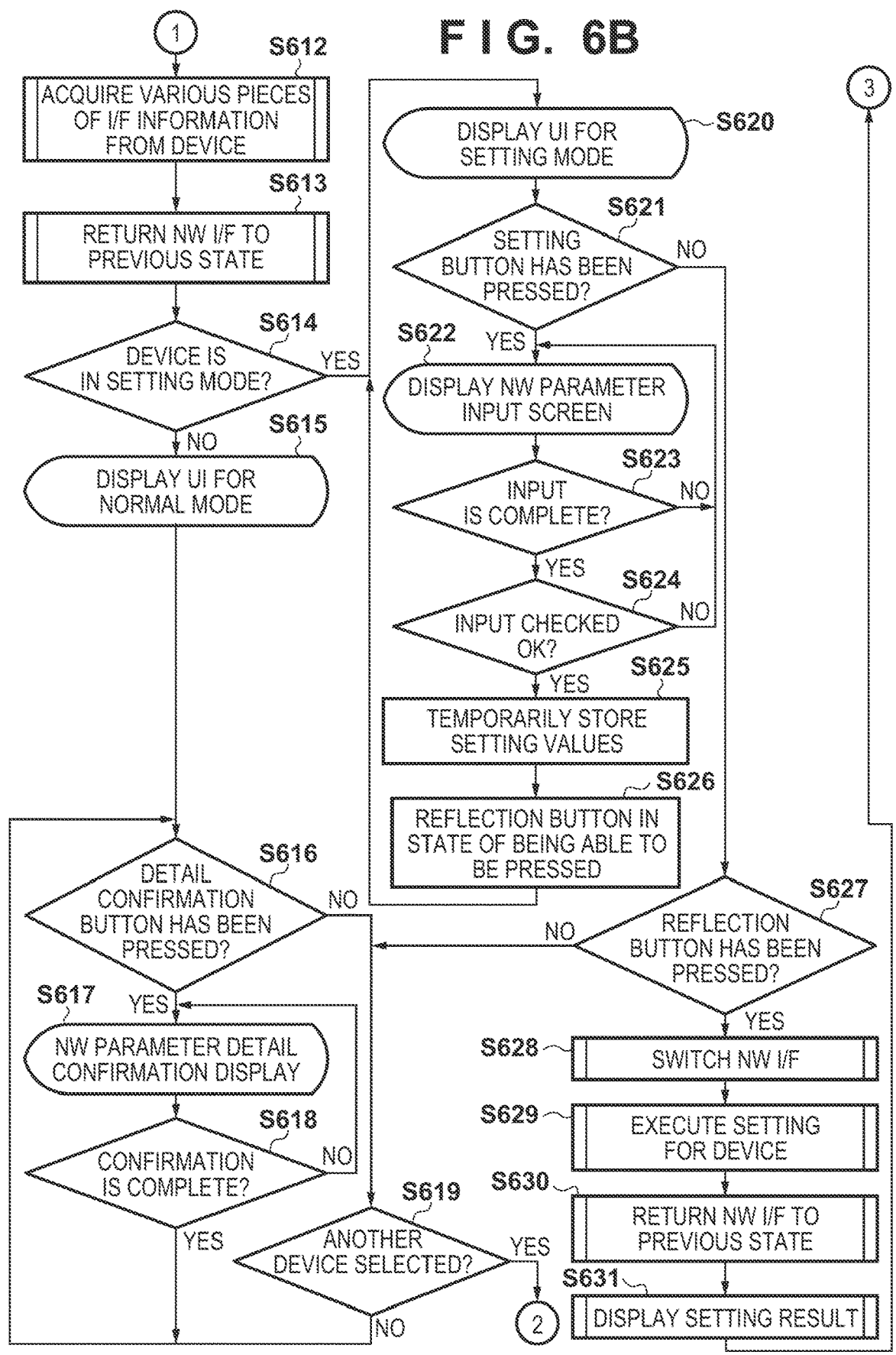

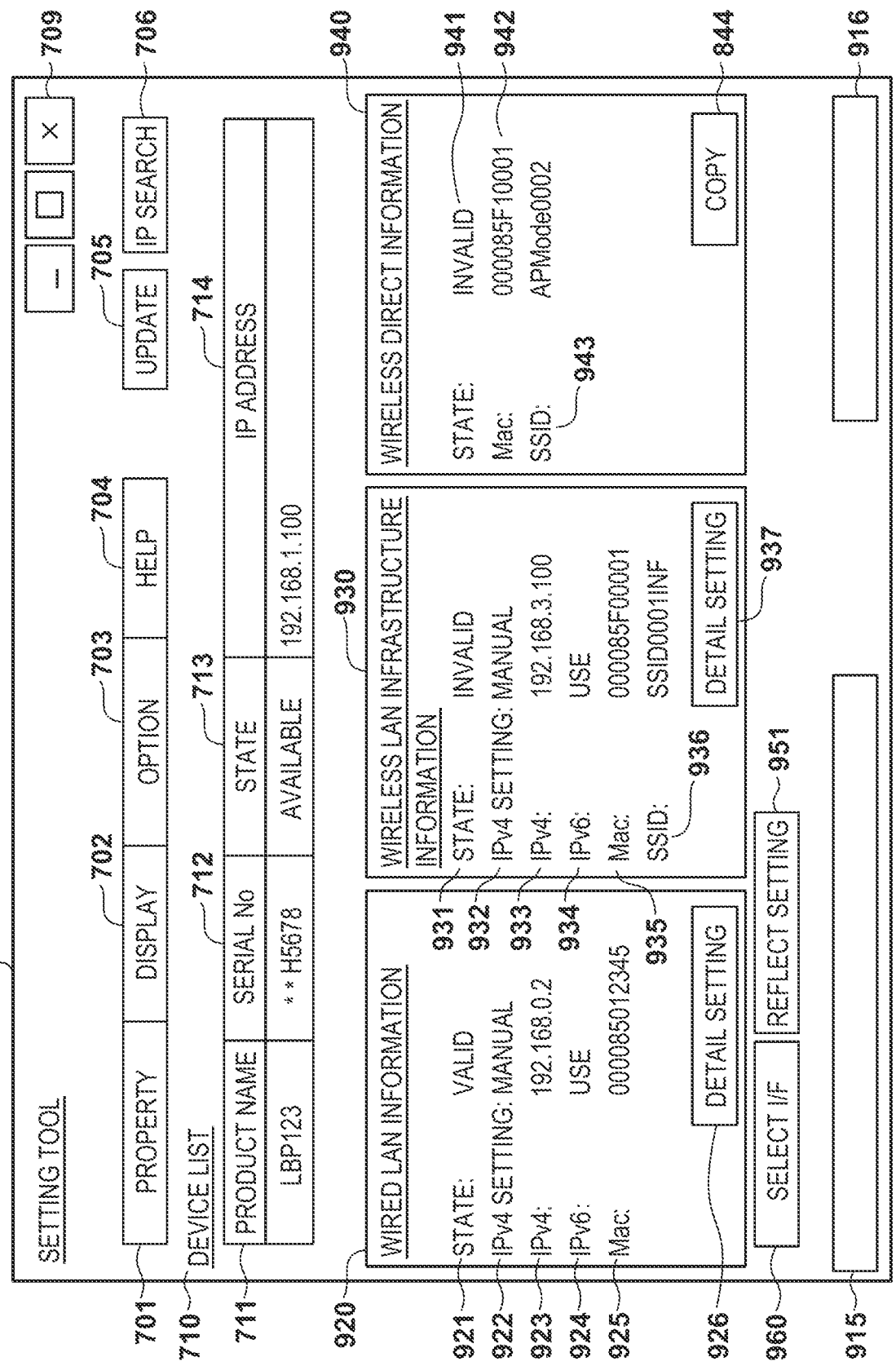

NETWORK SETTING (WIRED) CONFIRMATION

1001 — IPv4  1002 — IPv6

■ USE IPv4 ADDRESS

ACQUIRE IP ADDRESS AUTOMATICALLY
      PROTOCOL:          OFF
      AutoIP:               OFF 1020 — ◉ USE FOLLOWING IP ADDRESS
      IP ADDRESS:       192.168.0.2
      SUBNET MASK:     255.255.255.0
      GATEWAY ADDRESS:  192.168.0.251

[OK] 1005

---

1100

NETWORK SETTINGS (WIRED)

1101 — IPv4  1102 — IPv6

1110 — ☑ USE IPv4 ADDRESS
1111 — ◉ ACQUIRE IP ADDRESS AUTOMATICALLY
1112 — PROTOCOL: [OFF ▼]
1113 — AutoIP: [OFF ▼]

1120 — ◉ USE FOLLOWING IP ADDRESS
1121 — IP ADDRESS: [192.168.0.2]
1122 — SUBNET MASK: [255.255.255.0]
1123 — GATEWAY ADDRESS: [192.168.0.251]

[SET] [CANCEL]
1105   1106

FIG. 10

1200 NETWORK SETTINGS (WIRED)

- 1101 — IPv4 | 1102 — IPv6
- 1210 — ☑ USE IPv6 ADDRESS
- 1211 — ☑ USE STATELESS ADDRESS
  - 1212 — fe80::3e07:54f0:f0fe / fe80::1234:5678 / f0e0::1234:56f8:90f2
- 1220 — ☑ USE MANUAL ADDRESS
- 1221 — IP ADDRESS:    fe80::3e00:54f0:f0fe — 1222
- 1223 — PREFIX LENGTH:    24 — 1224
- 1225 — DEFAULT ROUTER ADDRESS: fe80::3e07:0001 — 1226
- 1230 — ☑ USE DHCPv6
- 1231 — STATEFUL ADDRESS:    fe80::3e00:54f0:f0fe
- 1232 — LINK LOCAL ADDRESS:    fe80::3e00:54f0:0000

SET 1105    CANCEL 1106

1300 NETWORK SETTING (WIRELESS) CONFIRMATION   ✕ 1307   ? 1308

- 1310 — SSID:    SSID_01234_Infra
- 1311 — SECURITY:    WEP
- 1312 — IPv4 | 1313 — IPv6    1314
- 1320 — ■ USE IPv4 ADDRESS
- 1321 — ⦿ ACQUIRE IP ADDRESS AUTOMATICALLY
- 1322 — PROTOCOL:    OFF
- 1323 — AutoIP:    OFF
- 1325 — USE FOLLOWING IP ADDRESS
- 1326 — IP ADDRESS:    192.168.0.2
- 1327 — SUBNET MASK:    255.255.255.0
- 1328 — GATEWAY ADDRESS:    192.168.0.251

OK 1305    CANCEL 1306

FIG. 12
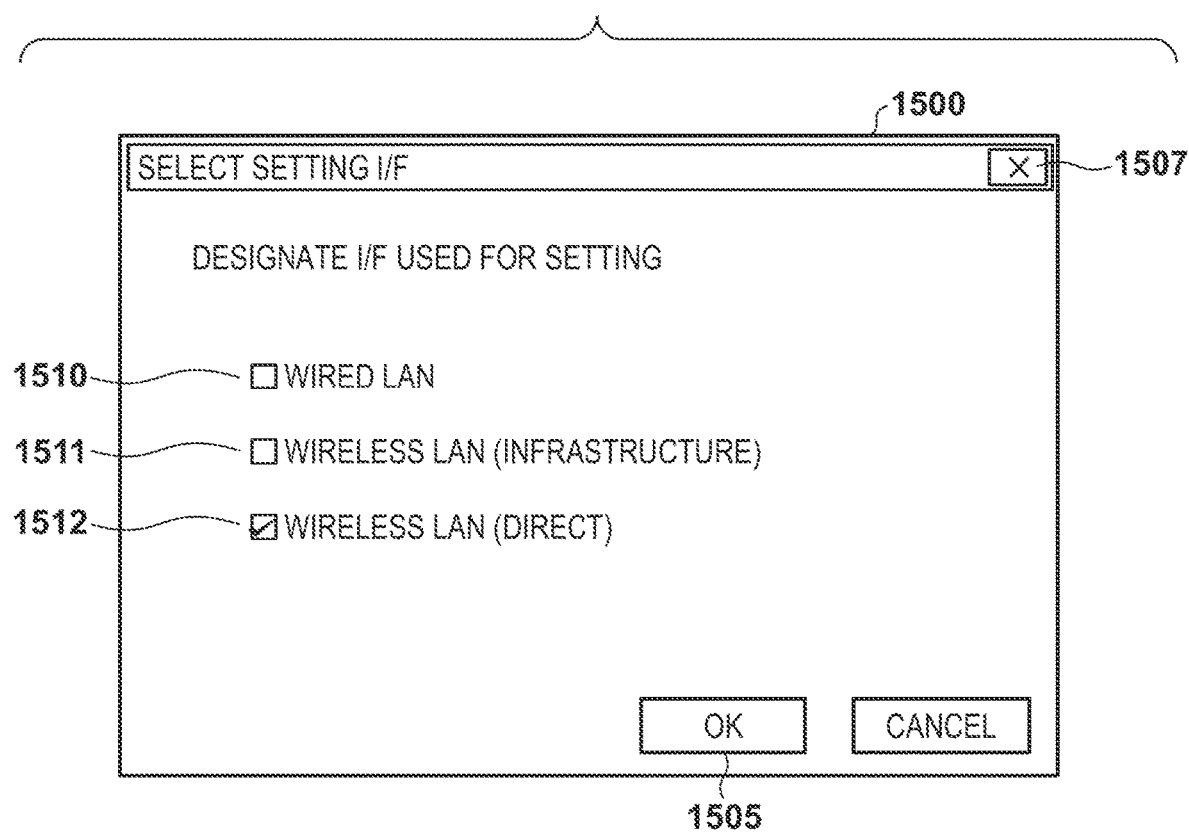
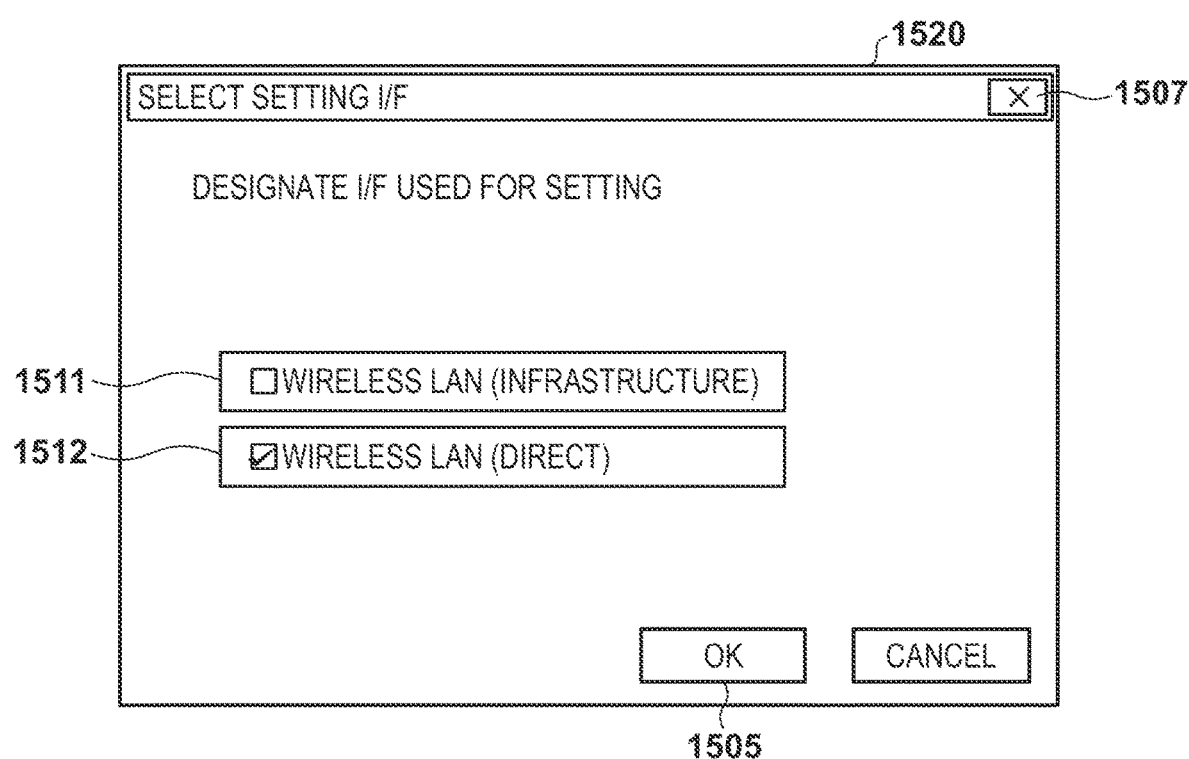

FIG. 14
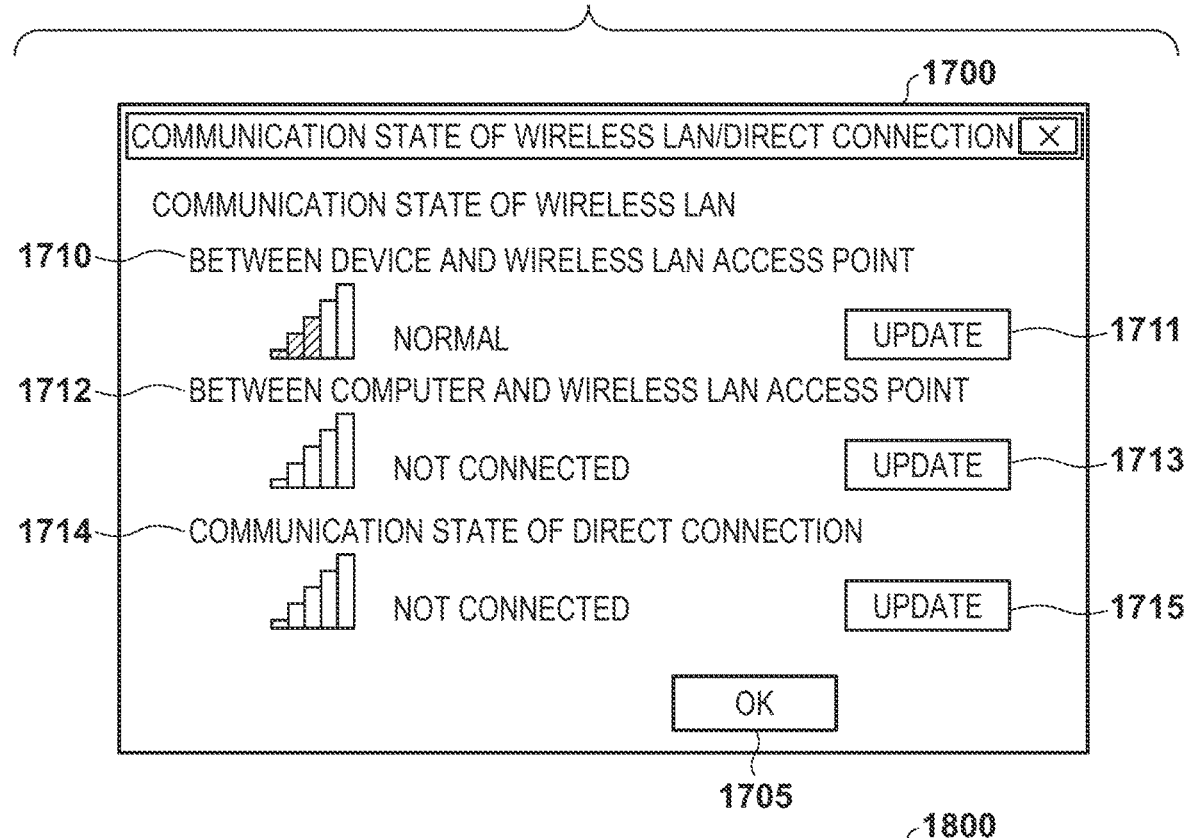
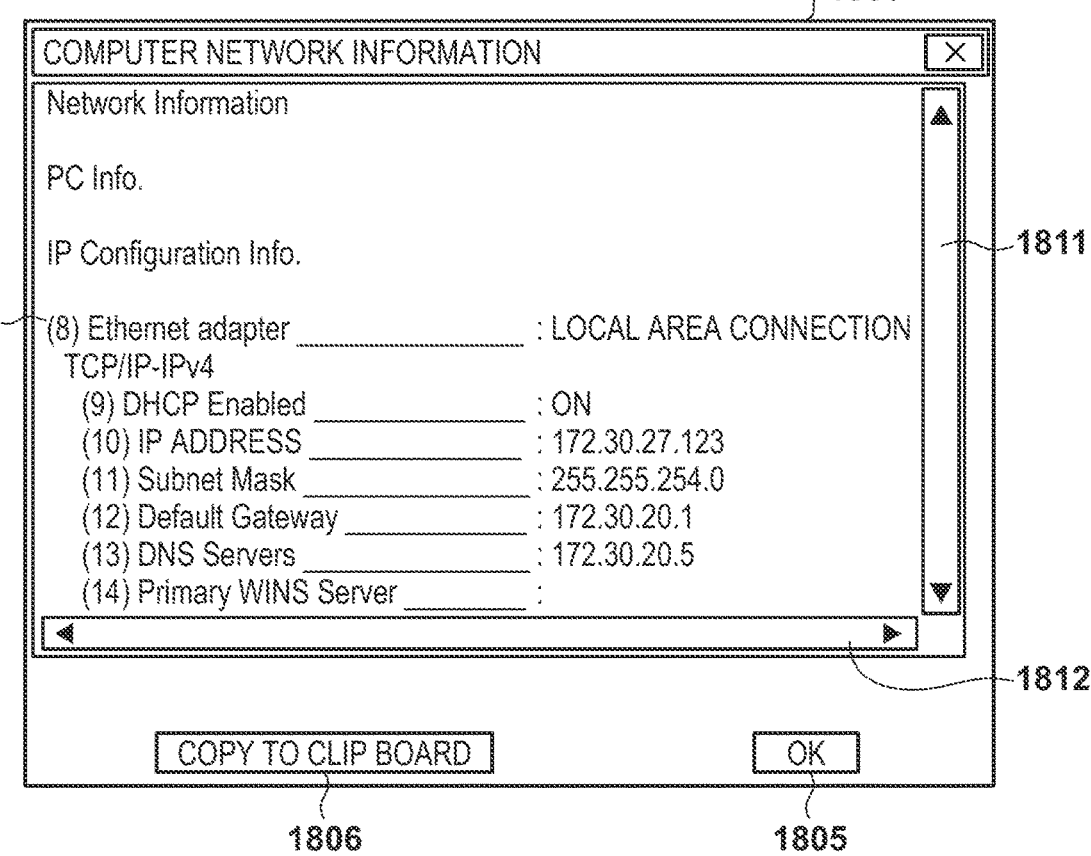

FIG. 15

SEARCH SETTINGS

- 1910 — SEARCH TIME: `10` SECONDS(5-30) :
  TIME REQUIRED TO SEARCH FOR DEVICE
- 1912 — TIME-OUT: `2` SECONDS(1-9) :
  NO RESPONSE FROM DEVICE
  DESIGNATE TIME-OUT VALUE
- 1914 — NUMBER OF ROUTERS: `1` (0-2) :
  NUMBER OF ROUTERS PASSED THROUGH WHEN SEARCHING FOR DEVICE OUTSIDE SUBNET

OK — 1905
CANCEL — 1906

— 1900

SEARCH USING IP ADDRESS — 2000

DESIGNATE IP ADDRESS AND SEARCH FOR DEVICE

- 2010 — ⦿ IPv4 ADDRESS  `192.168.0.215` — 2011
- 2012 — ◎ IPv6 ADDRESS  `Fe00::0001` — 2013

SEARCH — 2005
CANCEL — 2006

VERSION INFORMATION — 2100

Network Setup Tool

- 2110 — Version:  v1.10.05

OK — 2105

FIG. 16
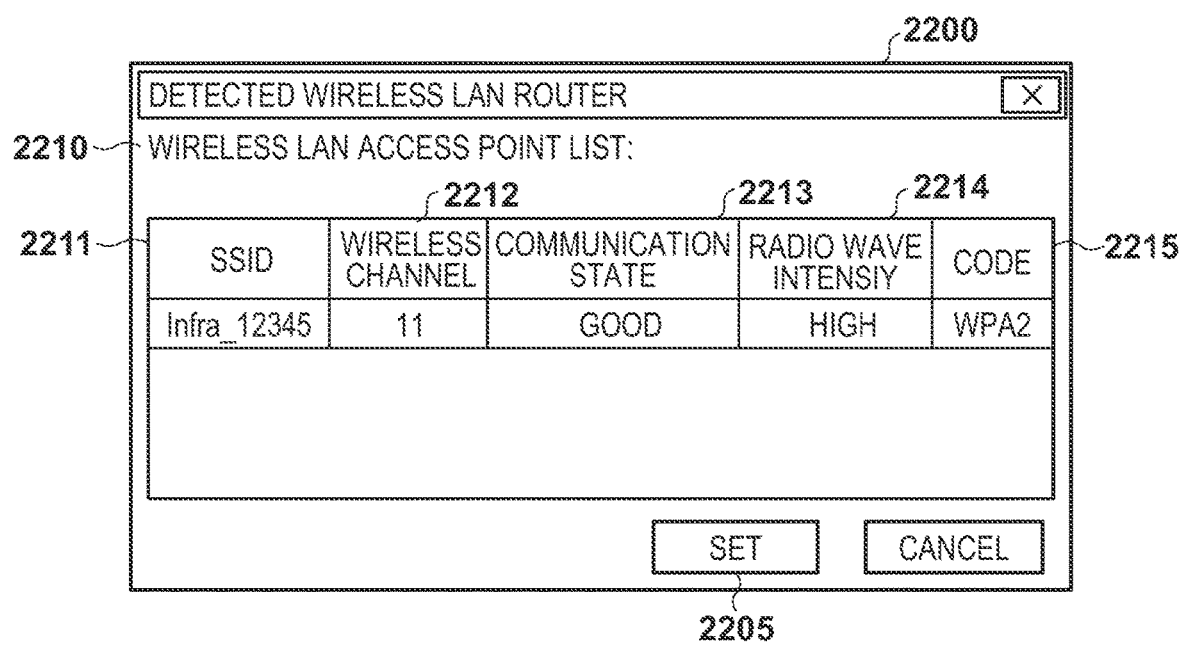
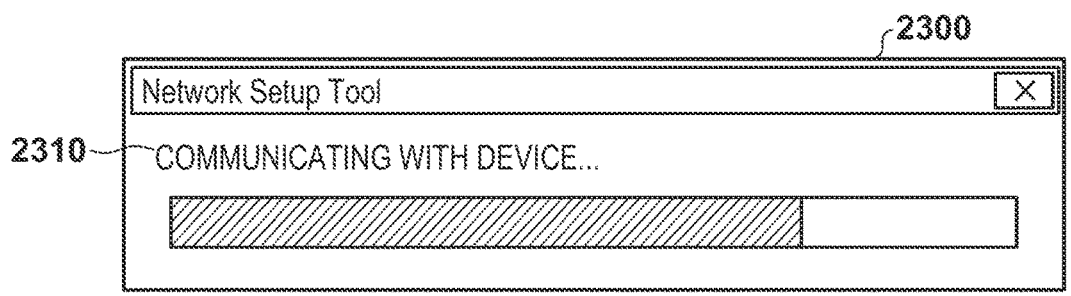
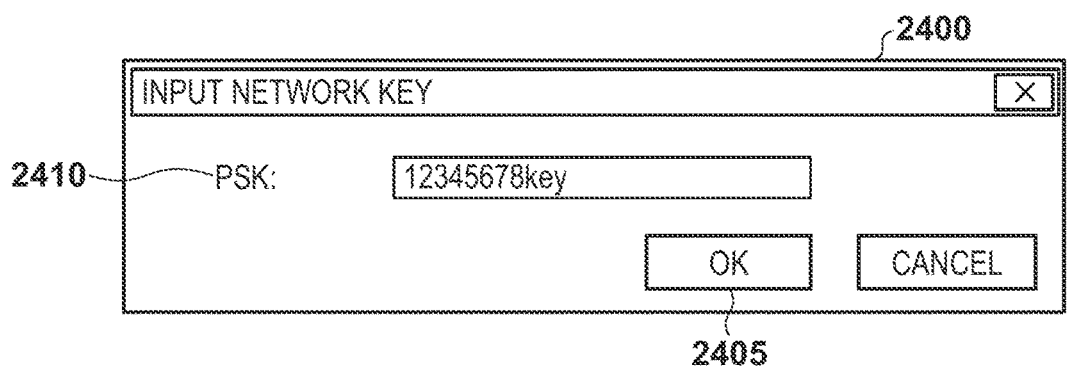

FIG. 22
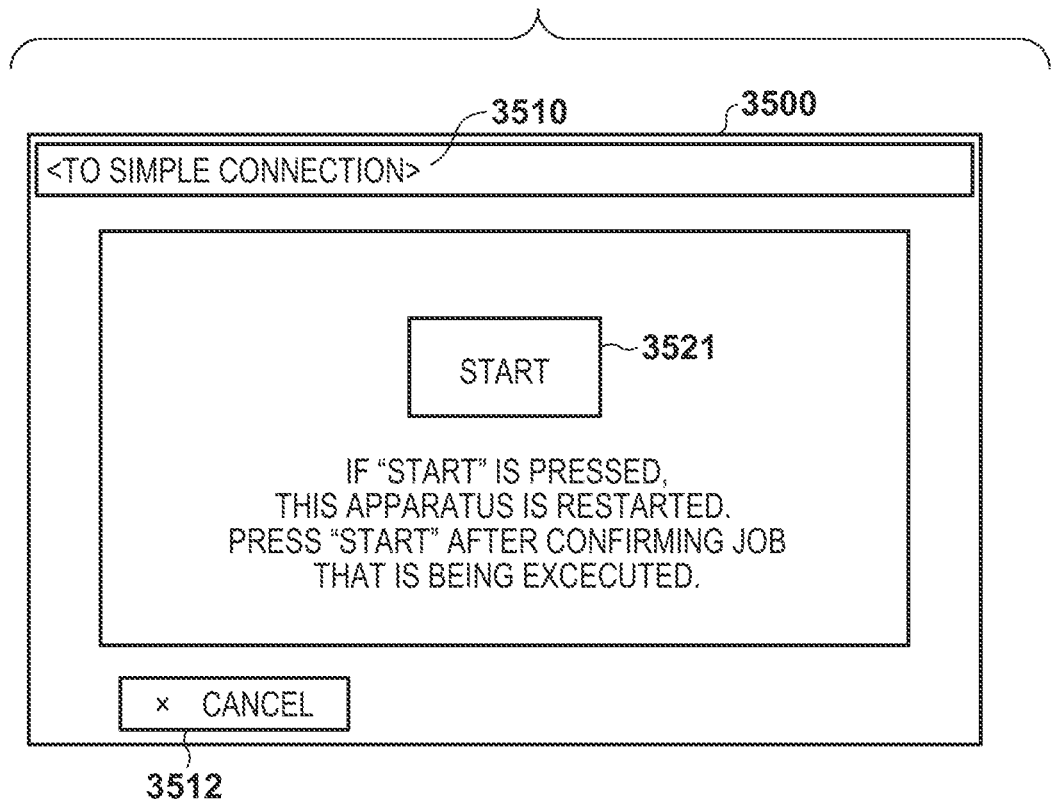
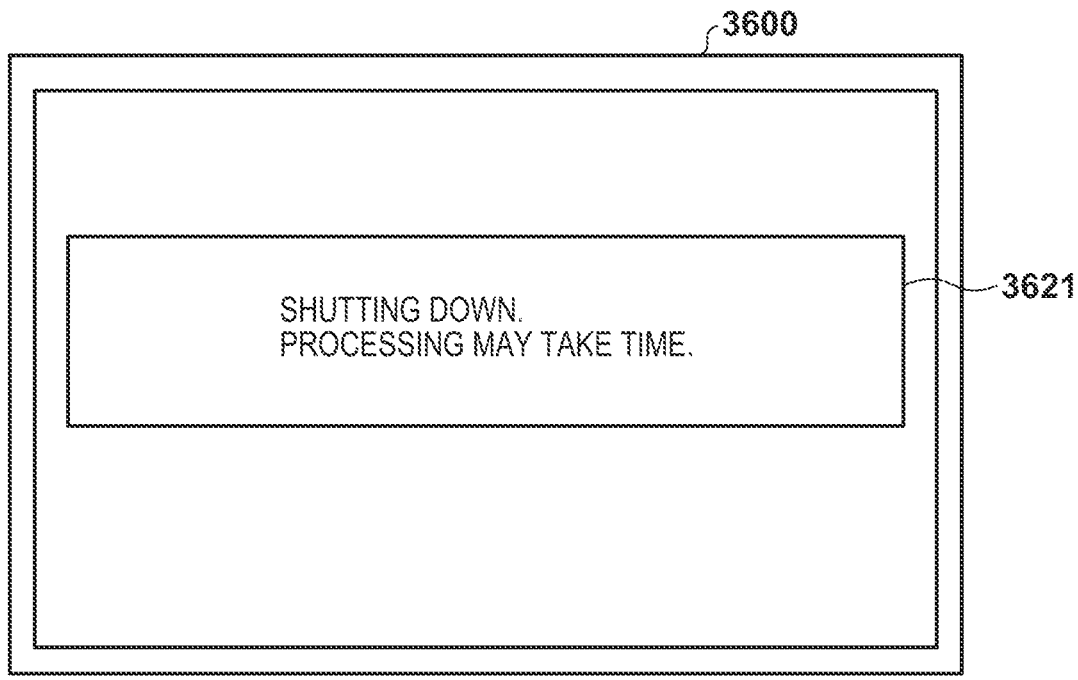

FIG. 25
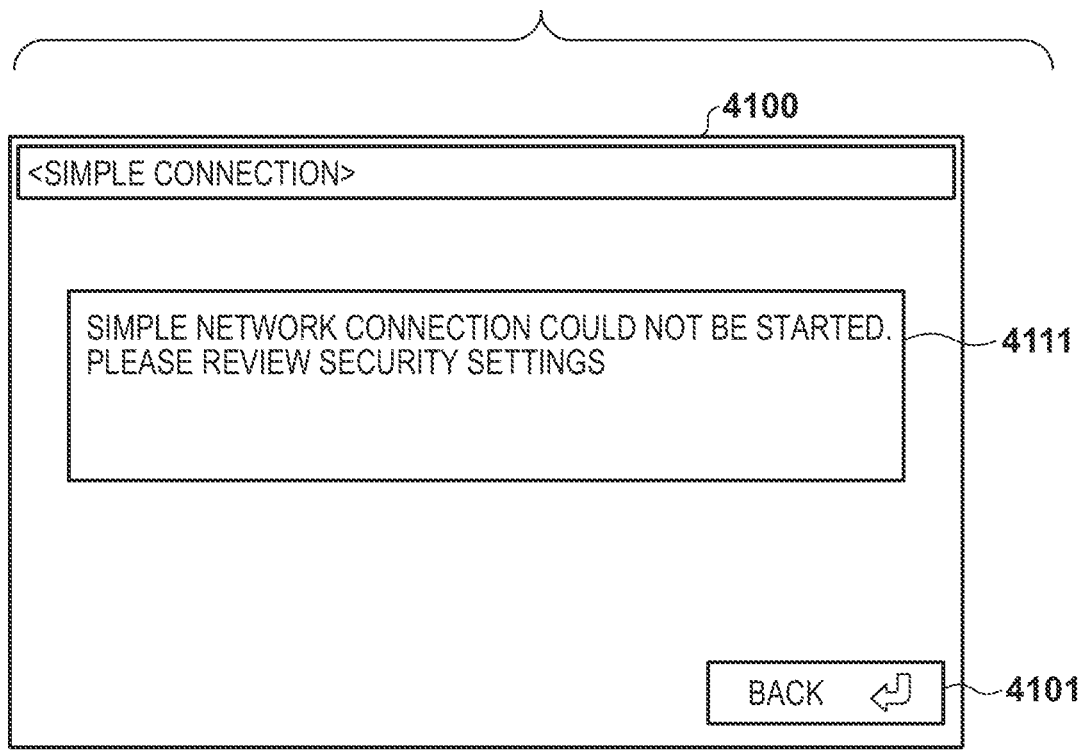
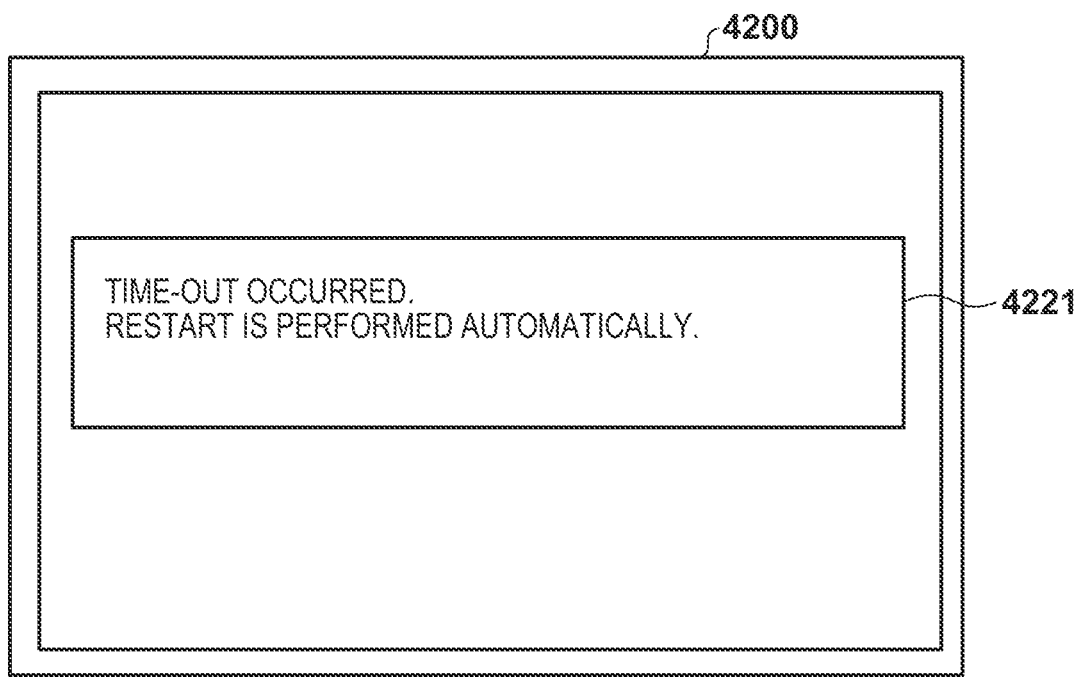

INFORMATION PROCESSING APPARATUS, PERIPHERAL APPARATUS, CONTROL METHOD THEREOF, STORAGE MEDIUM, AND SYSTEM

BACKGROUND OF THE INVENTION

Field of the Invention

The present invention relates to an information processing apparatus and a peripheral apparatus having a plurality of network interfaces, a control method thereof, a storage medium, and a system.

Description of the Related Art

Image forming apparatuses (peripheral apparatuses) such as inkjet printers and multifunctional devices have been provided with an interface that allows connection to a network, by default. In addition to peripheral apparatuses having a wired network interface, peripheral apparatuses having a wireless network interface are also known. There are also peripheral apparatuses provided with both of these network interfaces.

There are various setting items in network setting of a peripheral apparatus having such network interfaces, and there are cases where setting work feels troublesome to the user. In view of this, Japanese Patent Laid-Open No. 2007-81890 suggests a method for connecting a communication terminal (an information processing apparatus) for performing setting and a peripheral apparatus, using a USB cable that is easy to set or the like, and perform network setting in the wireless interface of the peripheral apparatus from the information processing apparatus connected to the peripheral apparatus.

However, the above conventional technique involves an issue to be described below. For example, utilities that run on an information processing apparatus, and perform network setting are known. In the above conventional technique, when setting a peripheral apparatus from an information processing apparatus using such a setting utility, an IP address needs to be set. However, if an IP address has not been set (for example, at the time of initial installation), the user is first required to set an IP address from the operation panel of the peripheral apparatus in order to perform communication for setting, which requires labor.

On the other hand, not only peripheral apparatuses provided with one network interface but also peripheral apparatuses provided with a plurality of network interfaces are in the market. In such peripheral apparatuses, there is a desire to use a network interface to which any connection has been established, to set another network interface. Alternatively, there is also a desire to change the network settings of a network interface itself to which connection has been established, and there is also a desire to perform such operations at the same time. A large amount of time may be required, for example, when performing restart, to change the settings of a network interface of a peripheral apparatus. Therefore, it is desired to reduce the number of times setting is performed as much as possible, by changing settings at the same time.

Moreover, a plurality of network interfaces of a peripheral apparatus are not necessarily always communicable with a network interface of an information processing apparatus that performs setting. Furthermore, in a case where a network interface connected to perform setting is disconnected before and after the setting as well, it is not possible to perform connection confirmation for a network interface that has been set. In such a case, even if erroneous input was made when performing setting, a person that performed the setting cannot easily confirm the erroneous input, and it is difficult for this person to notice erroneous setting immediately after the setting was performed, for example, this person does not notice the erroneous setting until a disconnection error occurs during communication when the peripheral apparatus is normally operated. Therefore, in the current status, it cannot be said that a user-friendly system is provided since it is necessary to carefully perform network setting of a network interface, for example.

SUMMARY OF THE INVENTION

The present invention enables realization of a mechanism for suitably performing network setting of a peripheral apparatus having a plurality of network interfaces, using a predetermined network interface, and reducing user's labor related to connection of the predetermined network interface.

One aspect of the present invention provides an information processing apparatus that performs network setting of a peripheral apparatus having a plurality of communication interfaces, the information processing apparatus comprising: a connection unit that connects the information processing apparatus to the peripheral apparatus using a predetermined communication interface from among the plurality of communication interfaces; and a setting unit that performs setting of the plurality of communication interfaces of the peripheral apparatus via the predetermined communication interface, wherein in a case where a type of the predetermined communication interface is a wired communication interface, an IP address used when the connection unit performs connection is determined using AutoIP.

Another aspect of the present invention provides a peripheral apparatus that has a plurality of communication interfaces, and whose network setting can be performed by an information processing apparatus, the peripheral apparatus comprising: a starting unit that performs startup in a case where connection is made using a predetermined communication interface from among the plurality of communication interfaces when performing network setting from the information processing apparatus, the startup being performed in accordance with a type of the predetermined communication interface and an operation mode of the peripheral apparatus; and a reflection unit that acquires and reflects setting content from the information processing apparatus, wherein, in a case where the type of the predetermined communication interface is a wired communication interface, an IP address used when connection to the information processing apparatus is made is determined using AutoIP.

Still another aspect of the present invention provides a system in which an information processing apparatus performs network setting of a peripheral apparatus having a plurality of communication interfaces, the information processing apparatus including: a connection unit that connects the information processing apparatus to the peripheral apparatus using a predetermined communication interface from among the plurality of communication interfaces, and a setting unit that performs setting of the plurality of communication interfaces of the peripheral apparatus via the predetermined communication interface, and the peripheral apparatus including: a starting unit that starts the peripheral apparatus in accordance with a type of the predetermined communication interface and an operation mode of the peripheral apparatus, and a reflection unit that acquires and reflects content of setting performed by the setting unit, wherein, in a case where the type of the predetermined communication interface is a wired communication interface, an IP address used when connection to the information processing apparatus is made is determined using AutoIP.

Yet still another aspect of the present invention provides a control method of an information processing apparatus that performs network setting of a peripheral apparatus having a plurality of communication interfaces, the method comprising: connecting the information processing apparatus to the peripheral apparatus using a predetermined communication interface from among the plurality of communication interfaces; and performing setting of the plurality of communication interfaces of the peripheral apparatus via the predetermined communication interface, wherein in a case where a type of the predetermined communication interface is a wired communication interface, an IP address used for connection made in the connecting is determined using AutoIP.

Still yet another aspect of the present invention provides a control method of a peripheral apparatus that has a plurality of communication interfaces, and whose network setting can be performed by an information processing apparatus, the method comprising: performing startup in a case where connection is made using a predetermined communication interface from among the plurality of communication interfaces when performing network setting from the information processing apparatus, the startup being performed in accordance with a type of the predetermined communication interface and an operation mode of the peripheral apparatus; and reflecting setting content after acquiring the setting content from the information processing apparatus, wherein, in a case where the type of the predetermined communication interface is a wired communication interface, an IP address used when connection to the information processing apparatus is made is determined using AutoIP.

Yet still another aspect of the present invention provides a control method of a system in which an information processing apparatus performs network setting of a peripheral apparatus having a plurality of communication interfaces, the method comprising: in the information processing apparatus, connecting the information processing apparatus to the peripheral apparatus using a predetermined communication interface from among the plurality of communication interfaces; and performing setting of the plurality of communication interfaces of the peripheral apparatus via the predetermined communication interface; and in the peripheral apparatus, starting the peripheral apparatus in accordance with a type of the predetermined communication interface and an operation mode of the peripheral apparatus; and reflecting setting content after acquiring the setting content as a result of the performing setting, wherein, in a case where the type of the predetermined communication interface is a wired communication interface, an IP address used when connection to the information processing apparatus is made is determined using AutoIP.

Still yet another aspect of the present invention provides a non-transitory computer-readable storage medium storing a computer program for causing a computer to execute steps of a control method of an information processing apparatus that performs network setting of a peripheral apparatus having a plurality of communication interfaces, the method comprising: connecting the information processing apparatus to the peripheral apparatus using a predetermined communication interface from among the plurality of communication interfaces; and performing setting of the plurality of communication interfaces of the peripheral apparatus via the predetermined communication interface, wherein in a case where a type of the predetermined communication interface is a wired communication interface, an IP address used for connection made in the connecting is determined using AutoIP.

Yet still another aspect of the present invention provides a non-transitory computer-readable storage medium storing a computer program for causing a computer to execute steps of a control method of a peripheral apparatus that has a plurality of communication interfaces, and whose network setting can be performed by an information processing apparatus, the method comprising: performing startup, by a starting unit, in a case where connection is made using a predetermined communication interface from among the plurality of communication interfaces when performing network setting from the information processing apparatus, the startup being performed in accordance with a type of the predetermined communication interface and an operation mode of the peripheral apparatus; and reflecting setting content after acquiring the setting content from the information processing apparatus, wherein, in a case where the type of the predetermined communication interface is a wired communication interface, an IP address used when connection to the information processing apparatus is made is determined using AutoIP.

Further features of the present invention will be apparent from the following description of exemplary embodiments with reference to the attached drawings.

BRIEF DESCRIPTION OF THE DRAWINGS

FIGS. 6A and 6B are flowcharts showing a processing procedure of an information processing apparatus according to an embodiment.

FIG. 8 is a diagram showing an example of a UI screen according to an embodiment.

FIG. 9 is a diagram showing an example of a UI screen according to an embodiment.

FIG. 10 is a diagram showing an example of a UI screen according to an embodiment.

FIG. 12 is a diagram showing an example of a UI screen according to an embodiment.

FIG. 14 is a diagram showing an example of a UI screen according to an embodiment.

FIG. 15 is a diagram showing an example of a UI screen according to an embodiment.

FIG. 16 is a diagram showing an example of a UI screen according to an embodiment.

FIG. 22 is a diagram showing an example of a UI screen according to an embodiment.

FIG. 25 is a diagram showing an example of a UI screen according to an embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Comparison Example

Figure 1:
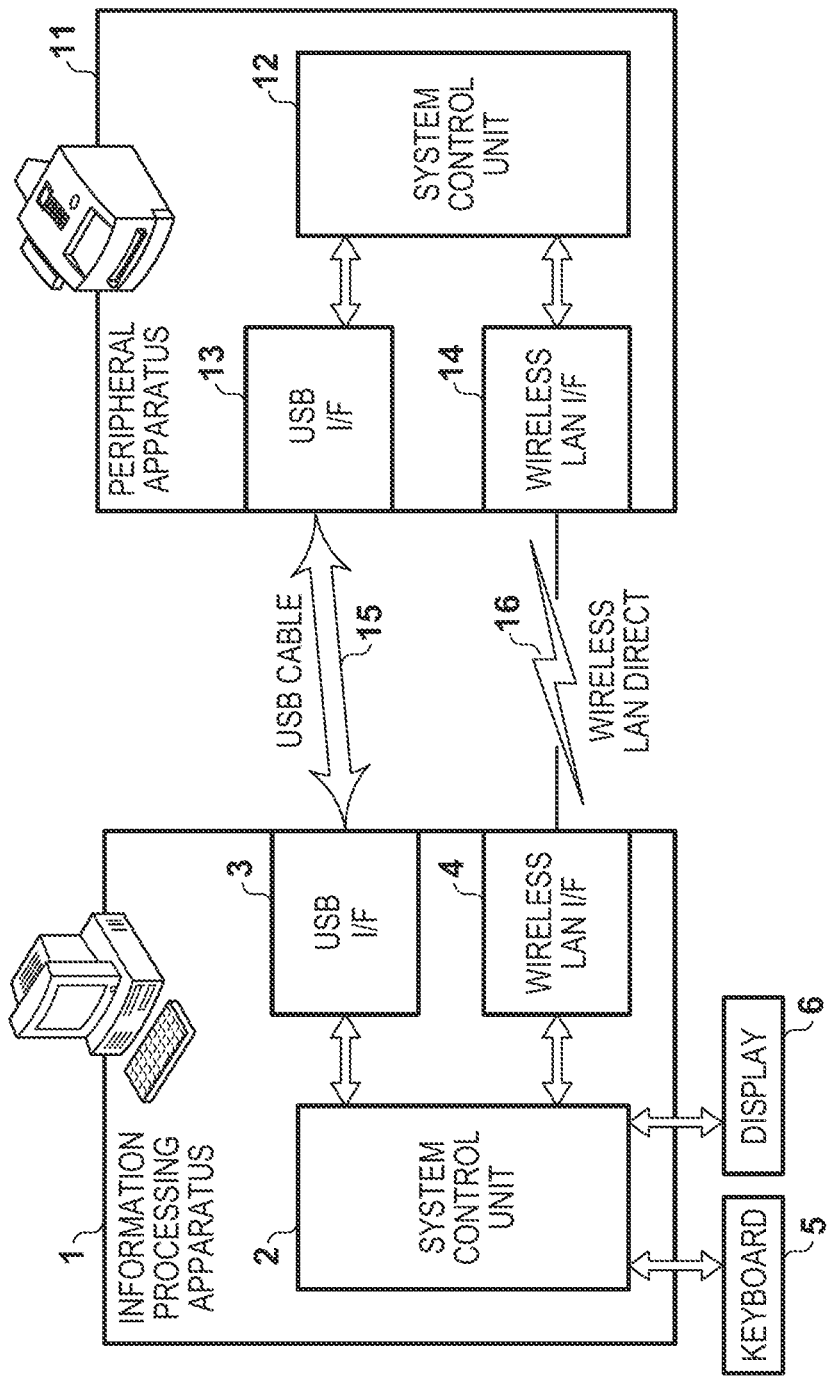
FIG. 1 is a block diagram showing a configuration of a communication system that is a comparison example.

First, a configuration of a communication system that is a comparison example of the present invention will be described with reference to FIG. 1. This communication system is constituted including an information processing apparatus 1 and a peripheral apparatus 11. The information processing apparatus 1 includes a system control unit 2, a USB interface (I/F) 3, and a wireless LAN I/F 4. In addition, a keyboard 5 and a display 6 are connected to the information processing apparatus 1. The peripheral apparatus 11 has a system control unit 12, a USB I/F 13, and a wireless LAN I/F 14. The information processing apparatus 1 and the peripheral apparatus 11 are connected via a USB cable 15, and are connected communicably using a wireless LAN direct 16. In this state, in the communication system that is a comparison example, communication is performed between the peripheral apparatus 11 and the information processing apparatus 1 via a wired USB I/F and a wireless LAN I/F.

Network setting of the wireless LAN direct 16 of the peripheral apparatus 11 is performed from the information processing apparatus 1 via the USB cable 15. After the wireless LAN direct 16 was set, a connection confirmation test is performed between the wireless LAN I/Fs (4 and 14) respectively connected to the apparatuses. After that, the information processing apparatus 1 acquires confirmation status information from the peripheral apparatus 11 via the USB cable 15, and displays the acquired confirmation status information on the display 6 of the information processing apparatus 1.

However, as described above, in such a configuration, if an IP address of a wired interface has not been set (for example, at the time of initial startup) in the first place, the user is first required to set an IP address from the operation panel of the peripheral apparatus 11, in order to perform communication for setting. Such work is laborious to the user, and a user-friendly system has not been provided. Note that network setting of the network between an information processing apparatus and a peripheral apparatus each having two interfaces, namely a USB I/F and a wireless LAN I/F has been described with reference to FIG. 1, but the present invention is not limited thereto, and there is a similar problem with an apparatus having another type of interface. The present invention provides a mechanism for reducing the labor as described above between apparatuses having various interfaces, and a description thereof will be given in detail in the following embodiments.

First Embodiment

System Configuration

A first embodiment of the present invention will be described below. First, a configuration example of a system according to this embodiment will be described with reference to FIGS. 2 to 5. FIGS. 2 to 5 show use modes of network connection corresponding to use types of network interfaces. The same reference numerals are assigned to the same constitute elements, and a redundant description is omitted.

Configuration Example of System 200

Figure 2:
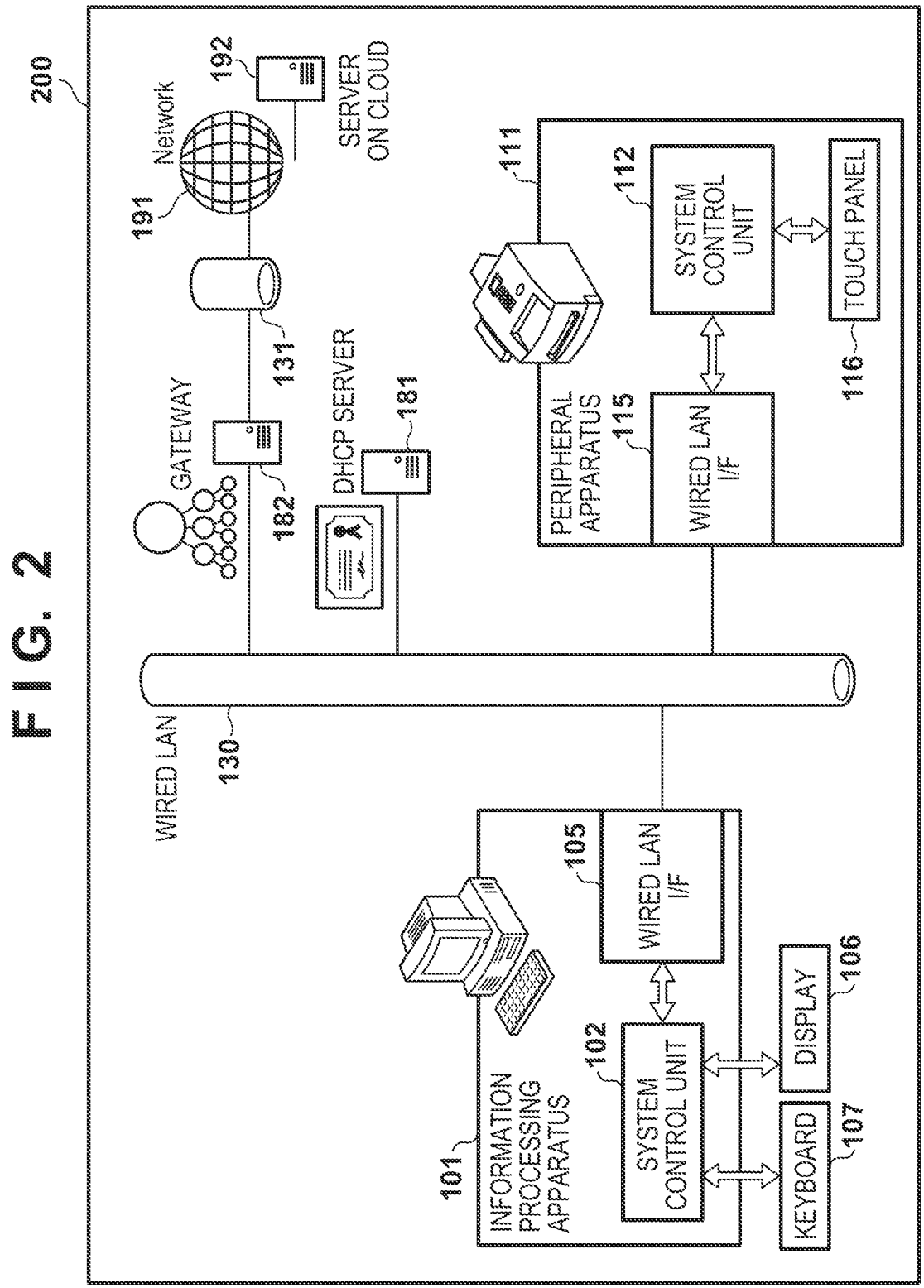
FIG. 2 is a block diagram showing a mode of a schematic configuration of a communication system according to an embodiment.

First, a system 200 in which network connection is performed using a wired LAN only will be described with reference to FIG. 2. As shown in FIG. 2, the system 200 is configured including an information processing apparatus 101 such as a personal computer (PC), a peripheral apparatus 111 that is an image processing apparatus such as a printing apparatus, a DHCP server 181, a gateway 182, and a server 192. The information processing apparatus 101 and the peripheral apparatus 111 are connected via a wired LAN 130. The DHCP server 181 and the gateway 182 are also connected via the wired LAN 130. This system is connected to a network 191 that is used beyond the gateway 182, via another wired LAN 131. The server 192 is further connected to this system via the network 191. A wired LAN is a network interface complied with an Ethernet standard such as IEEE802.3. These various interfaces may be incorporated in an apparatus, or may be extended so as to be detachable.

Figure 3:
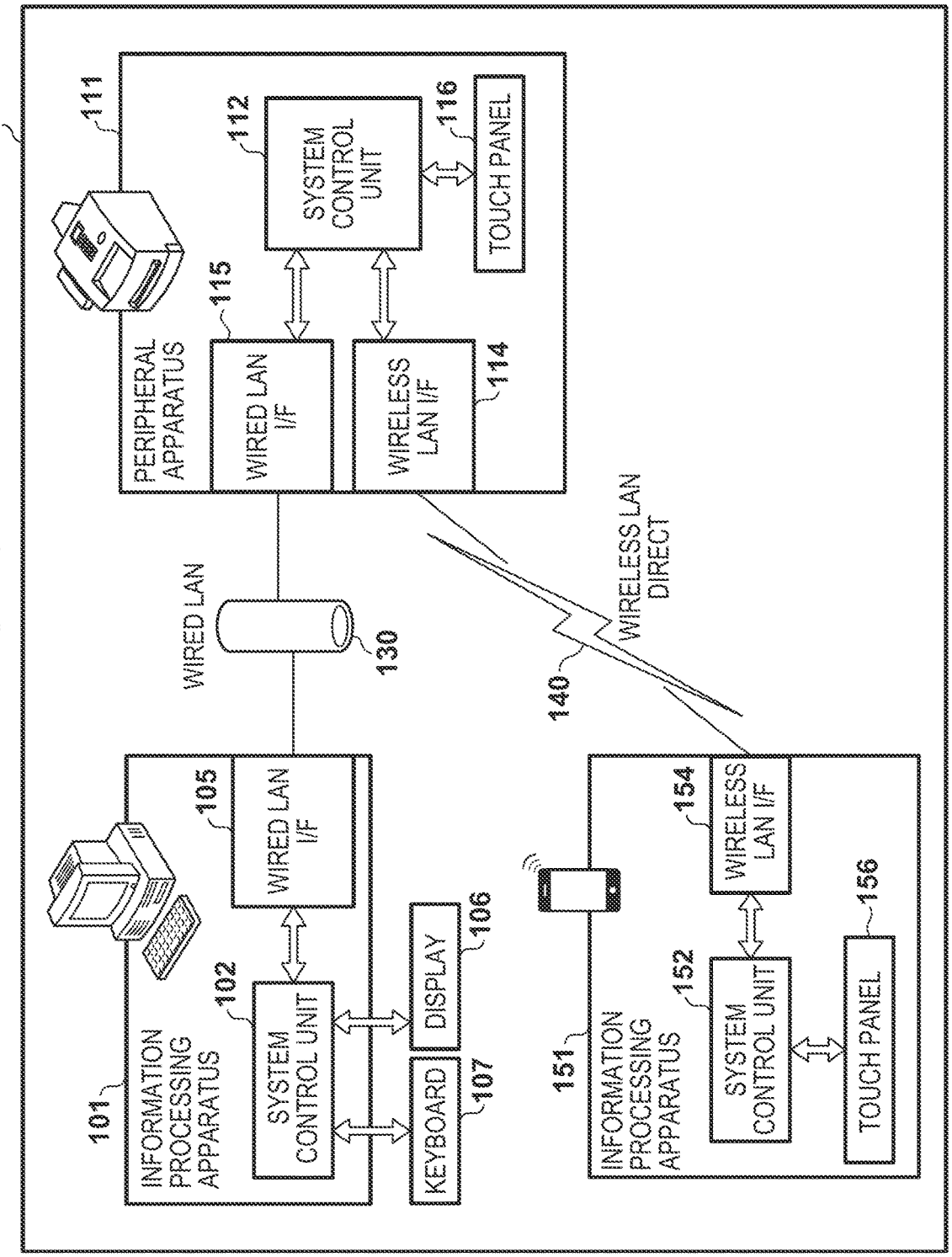
FIG. 3 is a block diagram showing a mode of a schematic configuration of a communication system according to an embodiment.
Figure 4:
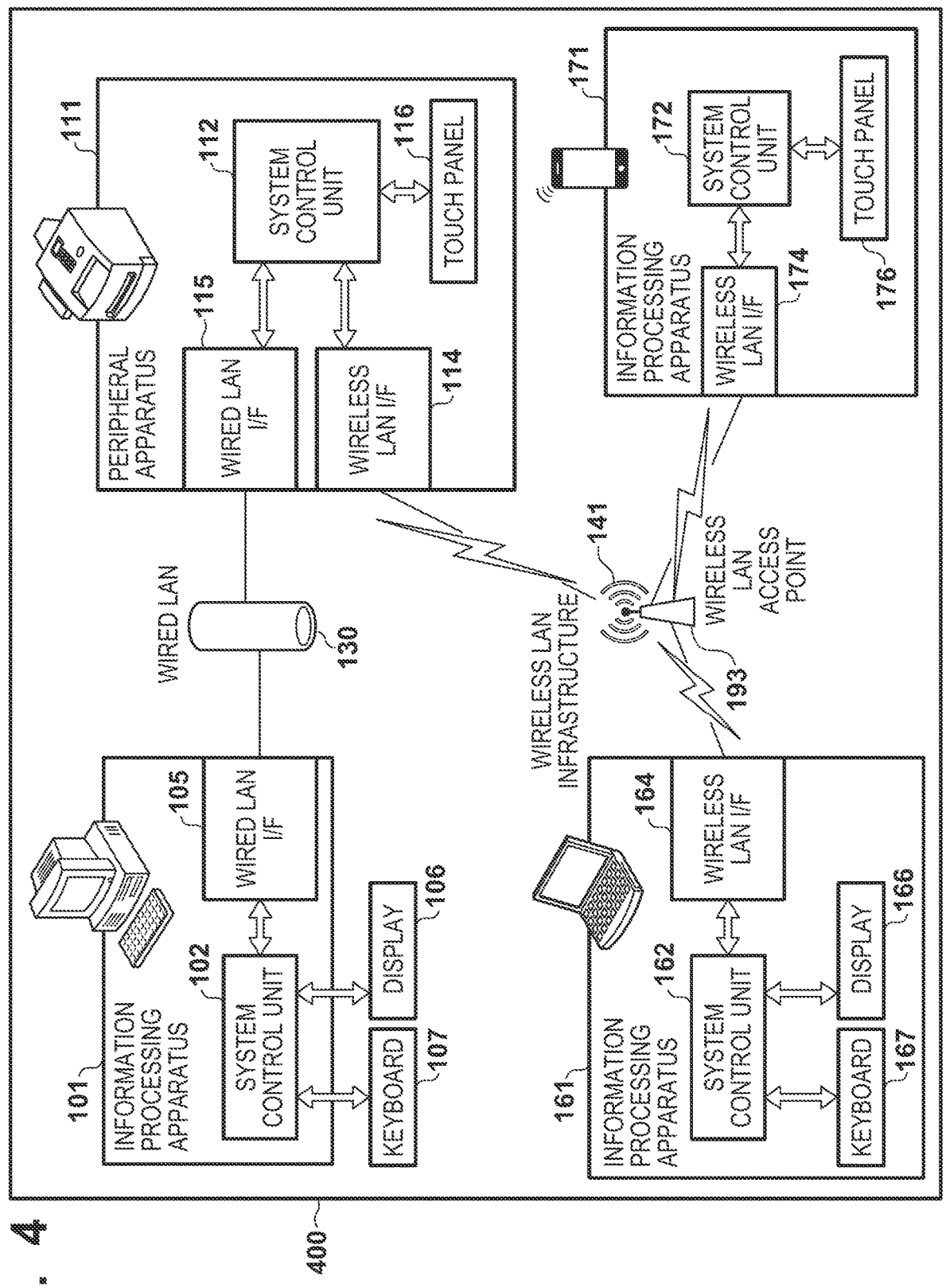
FIG. 4 is a block diagram showing a mode of a schematic configuration of a communication system according to an embodiment.
Figure 5:
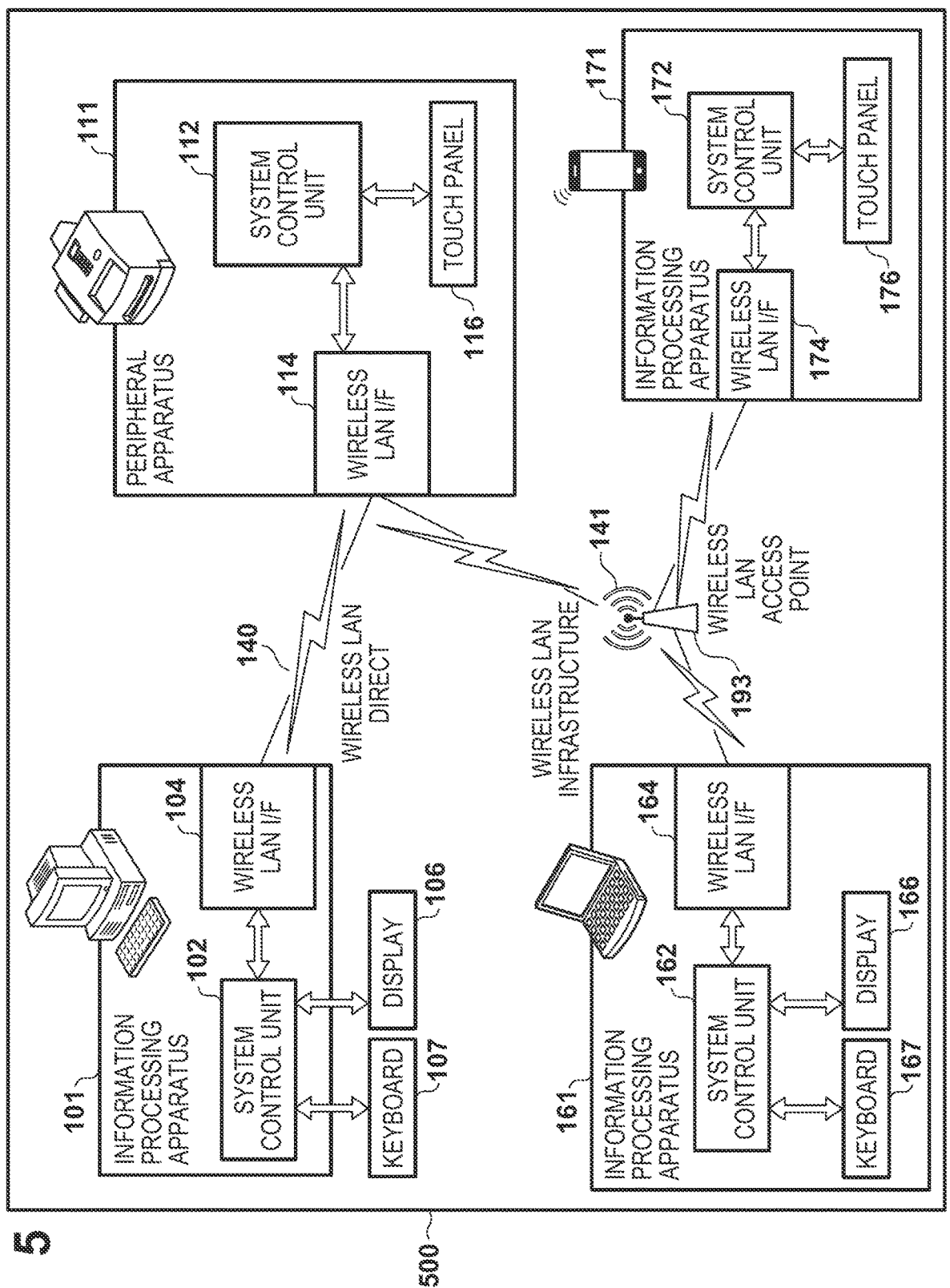
FIG. 5 is a block diagram showing a mode of a schematic configuration of a communication system according to an embodiment.

The information processing apparatus 101 and the peripheral apparatus 111 communicate with another network device through the server 192 on the network 191, whereby various services on the network are provided, and the user can enjoy functions and services. In FIGS. 3 to 5 to be described later, the DHCP server 181 and the network 191 beyond the gateway 182 are not illustrated, but may be included similar to FIG. 2.

The information processing apparatus 101 includes a system control unit 102 and a wired LAN I/F 105. Also, a keyboard 107 and a display 106 are connected to the information processing apparatus 101. The system control unit 102 integrally controls the entirely of the information processing apparatus 101. For example, the system control unit 102 is provided with a central processing unit (CPU), a ROM, and a RAM, and processing of the information processing apparatus that will be described later is achieved by the CPU reading out control programs stored in the ROM in advance to the RAM, and executing the control programs, for example. More specifically, an operating system (OS) that integrally controls the information processing apparatus 101 and a driver program for controlling interface hardware are executed. A Function desired by the user is then executed and controlled by application programs and the like arranged on the OS running mutually. Network connection setting processing of the peripheral apparatus 111 that will be described later in this embodiment is performed by executing, on the information processing apparatus, application programs for performing setting, and communicating with the peripheral apparatus 111. In the case where interaction input/display from/to the user is involved when executing a program, processing of the interaction is performed using the display 106 and the keyboard 107. Parameters for network connection and the like are input. These user interaction apparatuses may be detachable, and another form of user interaction apparatus may be used.

The wired LAN I/F 105 controls communication with an external apparatus such as the peripheral apparatus 111 connected via the wired LAN 130. The keyboard 107 is an input apparatus that accepts input from the user, and a pointing device such as a mouse can be included additionally or alternatively. The display 106 is a display apparatus that displays information to the user. Also, the display 106 may be configured to adopt a touch panel-type liquid crystal display unit to accept user input.

The peripheral apparatus 111 includes a system control unit 112, a wired LAN OF 115, and a touch panel 116. The system control unit 112 is provided with a central processing unit (CPU), a ROM, and a RAM, and processing of the peripheral apparatus that will be described later is achieved by the CPU reading out control programs stored in the ROM in advance to the RAM, and executing the control programs, for example. The wired LAN OF 115 controls communication with an external apparatus such as the information processing apparatus 101 connected via the wired LAN 130. The touch panel 116 is a touch panel-type liquid crystal display unit, which serves as an input apparatus that accepts input from the user, and also serves as a display apparatus that displays information to the user. Note that, in this embodiment, a printing apparatus is illustrated as the peripheral apparatus 111, but a digital camera, a video camera, a mobile terminal, a multifunctional device or the like may be used. Each peripheral apparatus has a network communication function, and has a function as the peripheral apparatus (an image forming function or an image recording function), but a description of those functions is omitted.

Configuration Example of System 300

Next, a system 300 in which network connection is performed using a wired LAN and a wireless LAN direct will be described with reference to FIG. 3. The same reference numerals are assigned to the same constituent elements as in FIG. 2, and a description thereof is omitted.

As shown in FIG. 3, the system 300 is configured further including an information processing apparatus 151 in addition to the information processing apparatus 101 and the peripheral apparatus 111 shown in FIG. 2. In the peripheral apparatus 111, two types of network interfaces, namely, the wired LAN 130 and a wireless LAN direct 140 can be used. In this manner, the peripheral apparatus 111 in the system 300 is connected to the information processing apparatus 101 via the wired LAN 130 similar to the system 200 in FIG. 2, and is further direct-connected to the information processing apparatus 151 via the wireless LAN direct 140. Description of a direct mode is omitted, but direct connection as mentioned herein refers to communication being performed directly between a plurality of wireless LAN interfaces without interposing a wireless LAN access point.

The information processing apparatus 101 has a configuration similar to the configuration shown in FIG. 2, and thus a description thereof is omitted. The peripheral apparatus 111 includes a wireless LAN I/F 114 in addition to the constituent elements in FIG. 2. The wireless LAN I/F 114 controls communication in a state of direct connection with the information processing apparatus 151 via the wireless LAN direct 140. Wireless LAN I/Fs (including wireless LAN I/Fs to be described later) in this embodiment are wireless network interfaces that comply with a wireless LAN standard such as IEEE802.11b/g/n standard. There are connection modes such as infrastructure connection by which wireless communication is performed via a wireless LAN access point and wireless LAN direct connection by which wireless communication is directly performed, depending of a connection type of wireless LAN I/F. In infrastructure connection, a wireless LAN access point is required, and network communication is performed via this access point. Note that regarding an access point (an apparatus), there may be a connection mode in which communication in an infrastructure mode is performed using one of wireless LAN I/Fs (104, 114, 154, 164, 174 and the like) also functioning as an access point, rather than an access point being separately provided.

The information processing apparatus 151 includes a system control unit 152, a wireless LAN I/F 154, and a touch panel 156. The system control unit 152 is provided with a central processing unit (CPU), a ROM, and a RAM, and processing of the information processing apparatus that will be described later is achieved by the CPU reading out control programs stored in the ROM in advance to the RAM, and executing the control programs, for example. The wireless LAN I/F 154 controls communication with an external apparatus such as the peripheral apparatus 111 connected via the wireless LAN direct 140. The touch panel 156 is a touch panel-type liquid crystal display unit, which serves as an input apparatus that receives input from the user, and also serves as a display apparatus that displays information to the user.

Configuration Example of System 400

Next, a system 400 in which network connection is performed using a wired LAN and wireless LAN infrastructure (infrastructure mode) will be described with reference to FIG. 4. The same reference numerals are assigned to the same constituent elements as those in FIGS. 2 and 3, and a description thereof is omitted.

As shown in FIG. 4, the system 400 is configured further including an information processing apparatus 161, an information processing apparatus 171, and a wireless LAN access point 193 in addition to the information processing apparatus 101 and the peripheral apparatus 111 shown in FIG. 2. In the peripheral apparatus 111, two types of network interfaces, namely the wired LAN 130 and wireless LAN infrastructure 141 can be used. In this state, the peripheral apparatus 111 in the system 400 is connected to the information processing apparatus 101 via the wired LAN 130 similar to the system 200 in FIG. 2, and is further connected to the information processing apparatuses 161 and 171 via the wireless LAN infrastructure 141.

The information processing apparatus 101 and the peripheral apparatus 111 has configurations similar to those shown in FIG. 3, and thus a description thereof is omitted. The information processing apparatus 161 includes a system control unit 162, a wireless LAN I/F 164, a display 166, and a keyboard 167. The system control unit 162 integrally controls the entirety of the information processing apparatus 161. The system control unit 162 is provided with a central processing unit (CPU), a ROM, and a RAM, and processing of the information processing apparatus that will be described later is achieved by the CPU reading out control programs stored in the ROM in advance to the RAM, and executing the control programs, for example. The wireless LAN I/F 164 controls communication with an external apparatus such as the peripheral apparatus 111 connected via the wireless LAN infrastructure 141. The keyboard 167 is an input apparatus that accepts input from the user, and a pointing device such as a mouse can be included additionally or alternatively. The display 166 is a display apparatus that displays information to the user. In addition, the display 166 may be configured to adopt a touch panel-type liquid crystal display unit to accept user input.

The information processing apparatus 171 includes a system control unit 172, a wireless LAN I/F 174, and a touch panel 176. The system control unit 172 is provided with a central processing unit (CPU), a ROM, and a RAM, and processing of the information processing apparatus that will be described later is achieved by the CPU reading out control programs stored in the ROM in advance to the RAM, and executing the control programs, for example. The wireless LAN I/F 174 controls communication with an external apparatus such as the peripheral apparatus 111 connected via the wireless LAN infrastructure 141. The touch panel 176 is a touch panel-type liquid crystal display unit, which serves as an input apparatus that accepts input from the user, and also serves as a display apparatus that displays information to the user.

Configuration Example of System 500

Next, a system 500 in which network connection is performed using a wireless LAN direct and wireless LAN infrastructure will be described with reference to FIG. 5. The same reference numerals are assigned to the same constituent elements as those in FIGS. 2 to 4, and a description thereof is omitted.

Similar to FIG. 4, the system 500 is configured including the information processing apparatus 101, the peripheral apparatus 111, the information processing apparatuses 161 and 171, and the wireless LAN access point 193 as shown in FIG. 5. In the peripheral apparatus 111, two types of network interfaces, namely the wireless LAN direct 140 and the wireless LAN infrastructure 141 can be used. In this state, the peripheral apparatus 111 in the system 500 is connected to the information processing apparatus 101 via the wireless LAN direct 140, and is further connected to the information processing apparatuses 161 and 171 via the wireless LAN infrastructure 141.

The information processing apparatus 101 includes a wireless LAN I/F 104 in place of the wired LAN I/F 105 shown in FIG. 2. The wireless LAN I/F 104 controls communication with an external apparatus such as the peripheral apparatus 111 connected via the wireless LAN direct 140. In addition, the peripheral apparatus 111 includes the wireless LAN I/F 114 in place of the wired LAN I/F 115 shown in FIG. 2. The wireless LAN I/F 114 controls communication in a state of direct connection with the information processing apparatus 101 via the wireless LAN direct 140, and controls communication with external apparatuses such as the information processing apparatuses 161 and 171 connected via the wireless LAN infrastructure 141. In addition, configurations of the information processing apparatus 161 and the information processing apparatus 171 are similar to that in FIG. 4, and thus a description thereof is omitted.

According to this embodiment, the information processing apparatus 101 and the like and the peripheral apparatus 111 are connected using various network interfaces as the systems 200 to 500 described above, and network connection setting is performed for a connection mode after the setting is performed. As a connection mode after setting is performed, a connection mode of the wired LAN 130 is conceivable, and in a wireless LAN, connection modes such as a direct mode and an infrastructure mode are conceivable. On the other hand, a connection mode when setting is being performed is not limited to a connection mode after the setting is performed, and a connection mode when setting is being performed is temporary, and communication for performing setting to achieve a connection mode after the setting is performed is merely performed, and a connection mode when setting is being performed is desirably used for as simple an operation as possible. Therefore, according to this embodiment, in the case of using a wired LAN for a connection mode when setting is being performed, an IP address of a wired LAN interface on the information processing apparatus is acquired by an acquisition operation using AutoIP. By using AutoIP, an IP address can be automatically determined without being assigned from a DHCP server or the like. By setting an IP address using this AutoIP, and using a multicast packet, communication beyond a subnet is made possible. On the other hand, in the case of using a wireless LAN for a connection mode when setting is being performed, a wireless access point in the vicinity is searched for using a wireless LAN interface on the information processing apparatus, and the wireless LAN is connected depending on a peripheral apparatus that operates in a setting-exclusive mode. After that, the information processing apparatus becomes a DHCP client, acquires an IP address from the peripheral apparatus, and performs communication.

Processing Procedure of Information Processing Apparatus 101

Figure 6A:
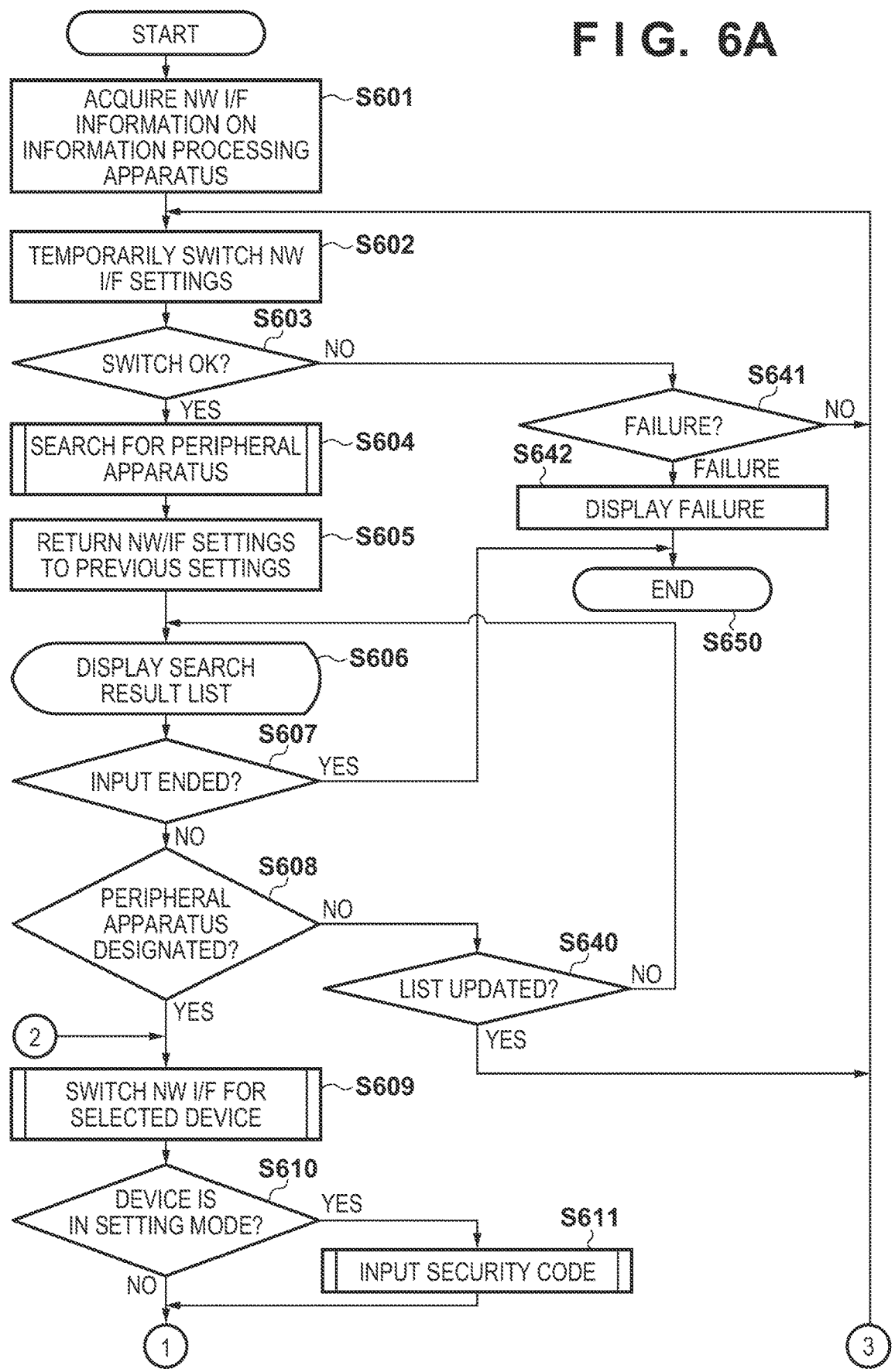

Next, a processing procedure of the information processing apparatus 101 for carrying out network setting of a system according to this embodiment will be described with reference to FIGS. 6A and 6B. By operating a setting application program on the information processing apparatus 101, network setting for the peripheral apparatus 111 is performed. Processing that will be described below is achieved by the CPU in the system control unit 102 reading out a control program stored in the ROM in advance to the RAM, and executing the control program, for example. Note that processing of the information processing apparatus 101 that will be described below can be applied to any connection mode of the system 200 to 500 described with reference to FIGS. 2 to 5.

When a setting application starts in the information processing apparatus 101, the system control unit 102 checks an attachment status and a setting status of network interfaces (NW I/Fs) on the information processing apparatus 101 in step S601. More specifically, the system control unit 102 acquires type information of each of the network interfaces attached to the information processing apparatus 101, from the network interface, and determines whether or not the network interface is a network interface that can be used from the application. Furthermore, if a wired LAN or a wireless LAN interface can be used, the system control unit 102 stores the current setting values, and acquires information as to whether or not there is a connection parameter that underwent wireless LAN connection in the past.

Next, in step S602, in order to connect the information processing apparatus 101 to the device (the peripheral apparatus) for which setting is performed, the system control unit 102 makes a temporary switch between network interfaces on the information processing apparatus 101. Here, for example, a switch can be made to a network interface that can communicate with the device by switching the settings of network interfaces. Subsequently, in step S603, the system control unit 102 determines whether or not the switch has been made. If the switch has been made, the procedure advances to step S604, and if the switch has not been made, the procedure advances to step S641 as error processing. In step S641, the system control unit 102 determines whether or not the switch has failed. Specifically, if the switch has not been made when a predetermined time elapsed after the switch started, the system control unit 102 determines that the switch has failed, and advances the procedure to step S642, and if the predetermined time has not elapsed, returns the procedure to step S602. Note that the above predetermined time is measured by a timer (not illustrated) provided in the system control unit 102, and a time that has lapsed after a switch is started is measured. In step S642, the system control unit 102 displays, on the display 106, that the switch has failed, and ends the procedure.

On the other hand, in step S604, the system control unit 102 searches for the peripheral apparatus 111 using the network interface to which a switch was made. Specifically, search is performed using an SSID (Service Set Identifier) in at least one of the wired LAN I/F 105 and the wireless LAN I/F 104 of the information processing apparatus 101. In the case where this search processing takes time, the system control unit 102 displays a screen 2600 shown in FIG. 17, on the display 106. The screen 2600 is configured including a message indicating that the device (the peripheral apparatus) is being searched for, a stop button 2606, and a close button 2607. Note that the search processing is performed via a predetermined communication interface out of a plurality of communication interfaces of the peripheral apparatus 111, for example, and a method for acquiring an IP address differs according to whether the communication interface is a wired LAN or a wireless LAN. As described above, as a method for acquiring an IP address, an IP address is determined using AutoIP in the case of a wired LAN, and in the case of a wireless LAN, an IP address is acquired by the information processing apparatus 101 operating as a DHCP client, and the peripheral apparatus 111 operating as a DHCP server. In addition, if it is desired to stop the search, the user can return to the previous screen by pressing the stop button 2606 to stop the search processing, which is not illustrated in this flowchart.

Figure 7A:
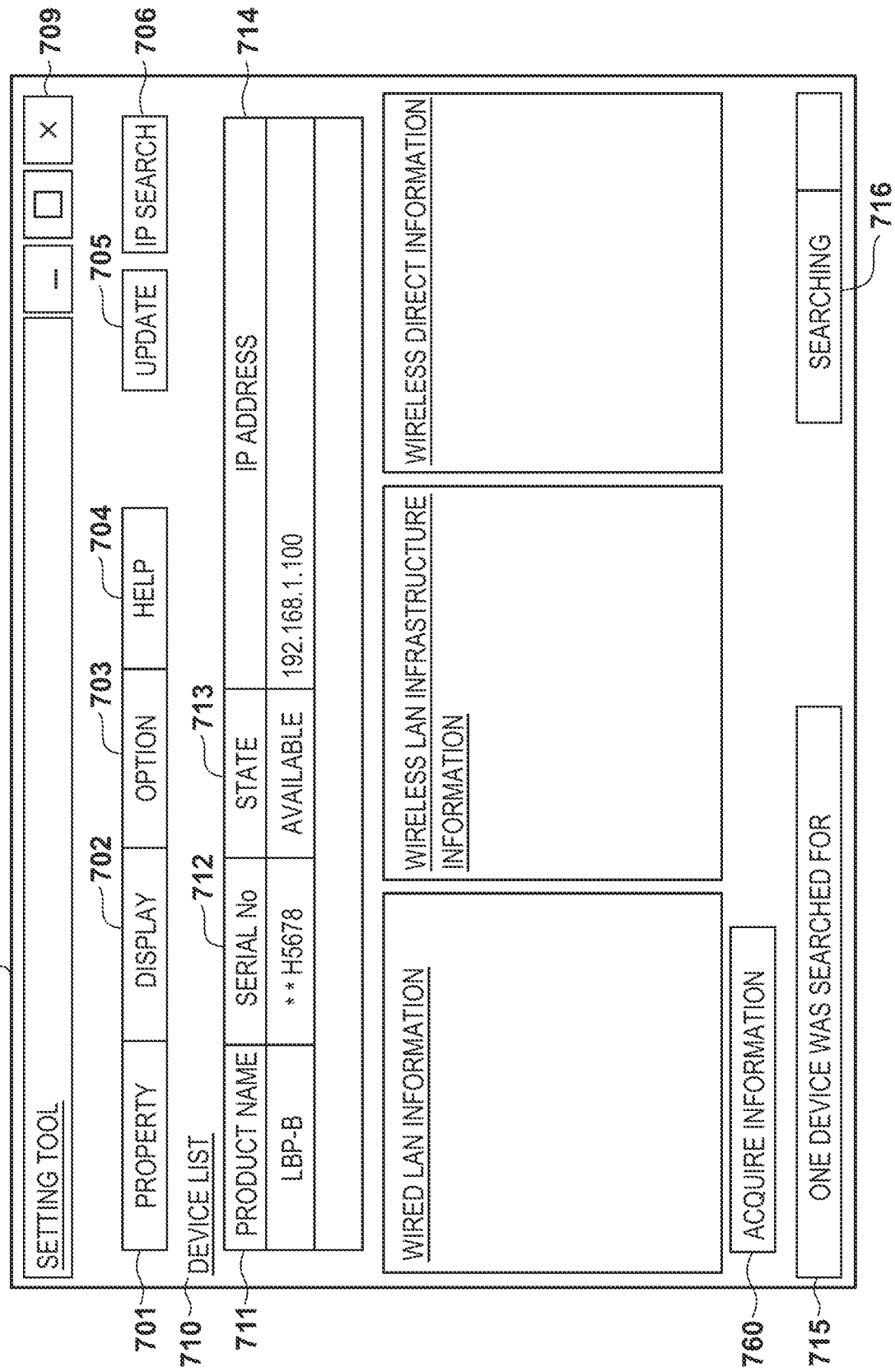
FIGS. 7A and 7B are diagrams showing an example of a UI screen according to an embodiment.

When search for the peripheral apparatus ends, the procedure advances to step S605, where the system control unit 102 returns the network interfaces on the information processing apparatus 101 to the state before the switch was made in step S602. Specifically, the system control unit 102 switches between the network interfaces based on the information stored in step S601. Subsequently, in step S606, the system control unit 102 displays, on the display 106, a list of peripheral apparatuses that were searched for in step S604. A screen 700 shown in FIG. 7A shows a main screen of a setting utility. The list of peripheral apparatuses that were searched for is displayed as a device list in 710. Specifically, a product name 711, a product serial number 712, an apparatus state 713, and a network IP address 714 are displayed for each peripheral apparatus that was searched for, and information display for determining a device on the network is performed. In addition, the screen 700 is configured including menu buttons 701 to 704, an update button 705, an IP search button 706, an end button 709, a message region 715, a status gauge display 716, and an information acquisition button 760. When one of the menu buttons 701 to 704 is pressed, the screen transitions to the screen of the corresponding menu. When the update button 705 is pressed, the information displayed on the screen 700 is updated. When the IP search button 706 is pressed, search for the device displayed in the device list 710 (step S604) is newly performed. A message to the user is displayed in the message region 715, and a message indicating that one device was found is displayed in the screen 700. The gauge display 716 indicates the current status, and for example, indicates that the device is being searched for as indicated in the screen 700. If the end button 709 is pressed, the operation of the setting utility ends.

Description will be given with reference to FIGS. 6A and 6B again. In step S607, the system control unit 102 determines whether or not an instruction to end the processing has been given through a user operation on the end button 709 in the screen 700, or the like. If an instruction to end the processing has been given, the processing ends. On the other hand, if an instruction to end the processing has not been given, the procedure advances to step S608, where the system control unit 102 determines whether or not a specific device has been selected from the device list 710. If a specific device has been selected, the procedure advances to step S609, and otherwise the procedure advances to step S640.

Figure 18:
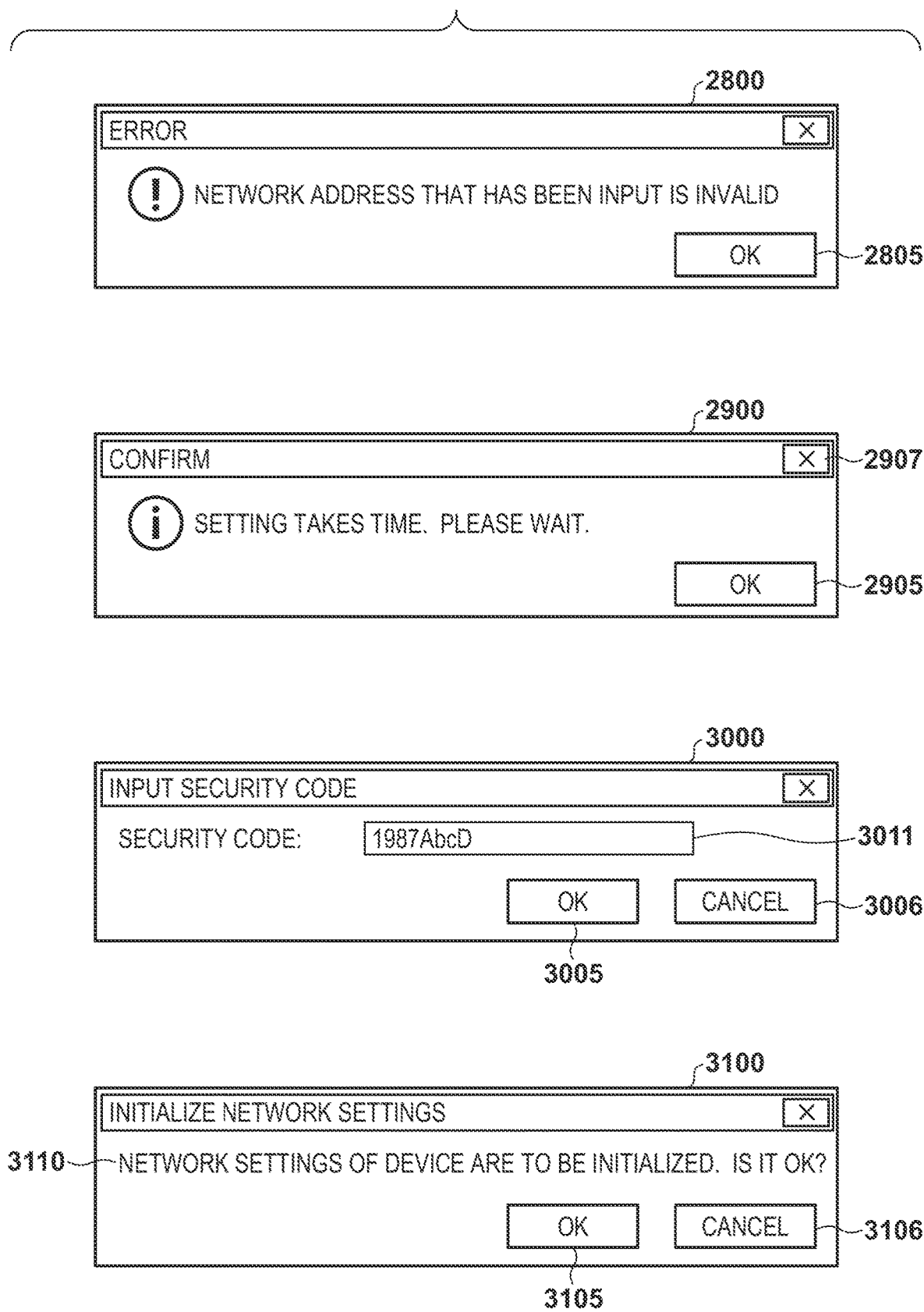
FIG. 18 is a diagram showing an example of a UI screen according to an embodiment.

In step S609, the system control unit 102 makes a switch to a network interface corresponding to the selected device in order to input detail information from the device. Subsequently, in step S610, the system control unit 102 determines the operation mode of the selected device. If the operation mode is a network setting mode, the procedure advances to step S611, where the system control unit 102 displays, on the display 106, a screen 3000 (FIG. 18) for inputting a security code for access to the device to be permitted. The screen 3000 is configured including a security code input region 3011, an OK button 3005, and a cancel button 3006. The security code for accessing the selected device can be input in the input region 3011 via the keyboard 107 or the like. When the OK button 3005 is pressed in the state where the security code is input, the security code that has been input is determined, and the procedure advances to step S612, and when the cancel button 3006 is pressed, the security code that has been input is cancelled, and the display screen returns to the screen before a transition was made to the screen 3000.

Description will be given with reference to FIGS. 6A and 6B again. If it is determined in step S610 that the operation mode is a normal operation mode, the procedure advances to step S612. In step S612, the system control unit 102 acquires detail parameters of network settings from the device according to the operation mode type. More specifically, a MIB is accessed using an SNMP (Simple Network Management Protocol) on the network, and thereby detail information is acquired. Subsequently, in step S613, the system control unit 102 returns the network settings on the information processing apparatus 101 that have been changed, to the original settings. Furthermore, the system control unit 102 displays the acquired detail information on the display 106, but the display is switched according to the operation mode of the device.

Figure 7B:
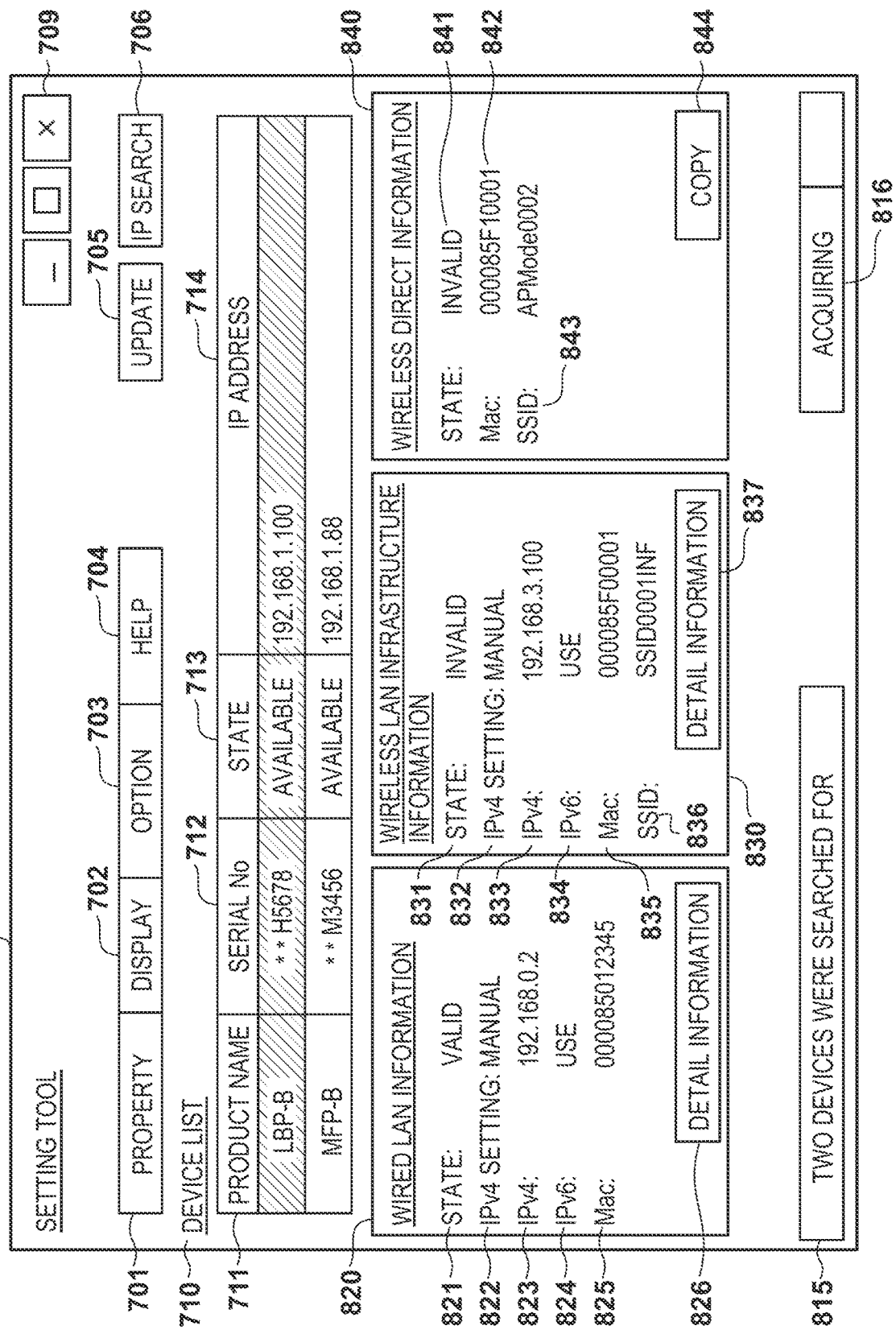

Next, in step S614, the system control unit 102 determines whether or not the operation mode of the device is a setting mode. If the operation mode is a normal mode, the procedure advances to step S615, where the system control unit 102 displays a screen 800 shown in FIG. 7B on the display 106. In the screen 800, two devices are displayed in the device list 710, and in the case where a device whose product name 711 is LBP-B is selected from the two devices, detail information regarding interfaces of the device is displayed in regions 820, 830, and 840, respectively. As information regarding a wired LAN, representative pieces of information 821 to 825 of IPv4 and IPv6 are displayed in the region 820. Furthermore, more detail information can be confirmed, if desired, by pressing a detail information button 826. Representative pieces of information 831 to 836 as information regarding wireless LAN infrastructure are displayed in the region 830. Similar to 820, detail information can be confirmed by pressing a detail information button 837, and a wireless LAN confirmation screen 1300 shown in FIG. 10 is displayed. Representative pieces of information 841 to 843 as information regarding wireless direct are displayed in the region 840. There is no detail information for wireless direct. By pressing a copy button 844 in this direct information display, clipboard copy of an SSID string can be performed. In addition, in the screen 800, the number of devices displayed during device search is also displayed in a message region 815. The message region 815 is a field for notifying the user of a result of executing any processing. A gauge indicating the progress of the status of communication processing is displayed in gauge display 816 during the communication processing.

Description will be given with reference to FIGS. 6A and 6B again. In step S616, the system control unit 102 determines whether or not the detail information button 826 has been pressed. If it is determined that the detail information button 826 has been pressed, the procedure advances to step S617, where the system control unit 102 displays, on the display 106, a wired LAN confirmation screen 1000 shown in FIG. 9. Confirmation information of IPv4 and confirmation information of IPv6 are respectively displayed in tabs 1001 and 1002 in the screen 1000. FIG. 9 shows a state where the tab 1001 is selected in the screen 1000, and a checkbox 1020 is selected to "use the following IP address" in the case of using an IPv4 address. If an OK button 1005 is pressed, display of the screen 1000 is ended, and the display screen returns to the original screen. In step S618, the system control unit 102 determines whether or not the items have been confirmed. Specifically, the system control unit 102 determines whether or not the OK button 1005 has been pressed, and if the OK button 1005 has been pressed, the procedure is returned to step S616.

If it is not determined in step S616 that the detail information button 826 has been pressed, the procedure advances to step S619, where the system control unit 102 determines whether or not another device (e.g., MFP-C) has been selected. If another device has not been selected, the procedure is returned to step S616. On the other hand, if another device has been selected, the procedure is returned to step S609, where the system control unit 102 acquires information regarding the other device. Subsequently, as described above, display is performed again in the regions 820, 830, 840 and the like, in accordance with the acquired information.

Moreover, if it is determined in step S614 that the device is in a setting mode, the procedure advances to step S620, where the system control unit 102 displays, on the display 106, a screen 900 shown in FIG. 8. Similar to the screen 800, display is performed in regions 920, 930 and 940 for respective interfaces, but display is performed by a user interface in which a setting operation is performed for the device. Information 921 to 925, information 931 to 936, and information 941 to 943 are respectively displayed in the regions 920, 930 and 940. Detail setting buttons 926 and 937 are also displayed. In addition, the screen 900 is displayed so as to include a message region 915 and status gauge display 916.

In step S621, the system control unit 102 determines whether or not the detail setting button 926 or 937 has been pressed. If it is determined that the detail setting buttons 926 or 937 has been pressed, the procedure advances to step S622, and otherwise the procedure advances to step S627. In step S622, the system control unit 102 displays a setting input screen corresponding to the detail setting button 926 or 937 that has been pressed. A screen 1100 in FIG. 9 is a screen for inputting settings related to IPv4 of a wired LAN. A screen 1200 in FIG. 10 is a screen for inputting settings related to IPv6. The screen 1100 and the screen 1200 can be switched using tabs 1101 and 1102, and those settings can be input through user input. The screen 1100 includes setting items 1110 to 1113 and 1120 to 1123 related to the IPv4 address, a setting button 1105, and a cancel button 1106. Also, the screen 1200 includes setting items 1210, 1211, 1220 to 1225 and 1230 to 1232 related to the IPv6 address, in place of the setting items of the screen 1100.

In step S623, the system control unit 102 determines whether or not input of the network setting items has ended. Specifically, the system control unit 102 determines whether or not input of the network setting items has ended, based on whether or not the setting button 1105 has been pressed. If it is determined that input has ended, the procedure advances to step S624, where the system control unit 102 checks input values so as to determine whether or not there is a problem with the setting items. If there is no problem with the setting items, the procedure advances to step S625, where the system control unit 102 temporarily holds the input values. Subsequently, in step S626, the system control unit 102 brings a setting reflection button 951 of the screen 900 displayed in step S620 to a state of being able to be pressed, and returns the procedure to step S620, where the screen 900 is displayed on the display 106.

On the other hand, if there is a problem with the setting items, for example, an invalid address is set, or setting items are inconsistent, the system control unit 102 returns the procedure to step S622, where the screen 1100 or the screen 1200 is displayed again. In addition, here, the system control unit 102 may perform control so as to display an error screen corresponding to a setting item as a screen 2800 shown in FIG. 18, prompt the user to input the setting item again, and return to the screen 1100 or 1200. In this manner, if it is determined in step S623 that input is not complete, or if it is determined in step S624 that there is a problem with a setting item, the procedure returns to step S622, where the screen 1100 or the screen 1200 that is an input screen is displayed.

Figure 11:
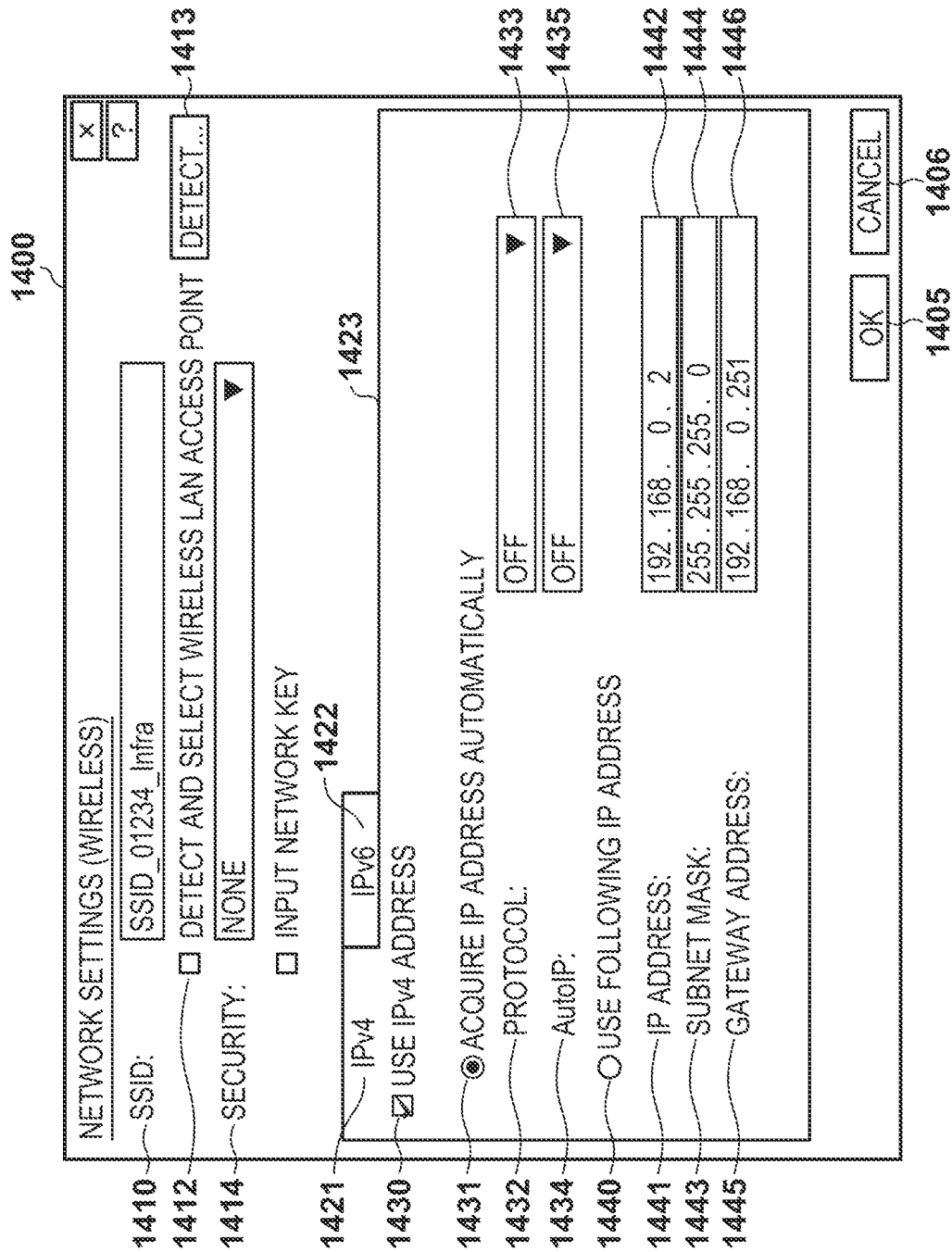
FIG. 11 is a diagram showing an example of a UI screen according to an embodiment.

In addition, when a detail setting button 937 is pressed in the screen 900, a screen 1400 in FIG. 11 that is a screen for inputting setting values of wireless LAN infrastructure is displayed. Reference numeral 1410 denotes a region for SSID settings, which allows input to change the settings. Moreover, by pressing a checkbox 1412, SSID information of the wireless LAN interface on the information processing apparatus 101 can be detected, and in that case, a detection button 1413 is enabled. If the detection button 1413 is pressed, a screen 2200 in FIG. 16 showing a list of detected wireless LAN access points is displayed on the display 106.

In the screen 2200, a list of information regarding wireless LAN infrastructure that is held on the information processing apparatus 101 is displayed. For example, information pieces such as SSID 2211, wireless channel 2212, communication state 2213, radio wave intensity 2214, and code 2215 that is being used are listed. By the user selecting one from this list, and pressing a setting button 2205, information related to the SSID is acquired, and is used for the input screen, and the display screen returns to the screen 1400.

Figure 17:
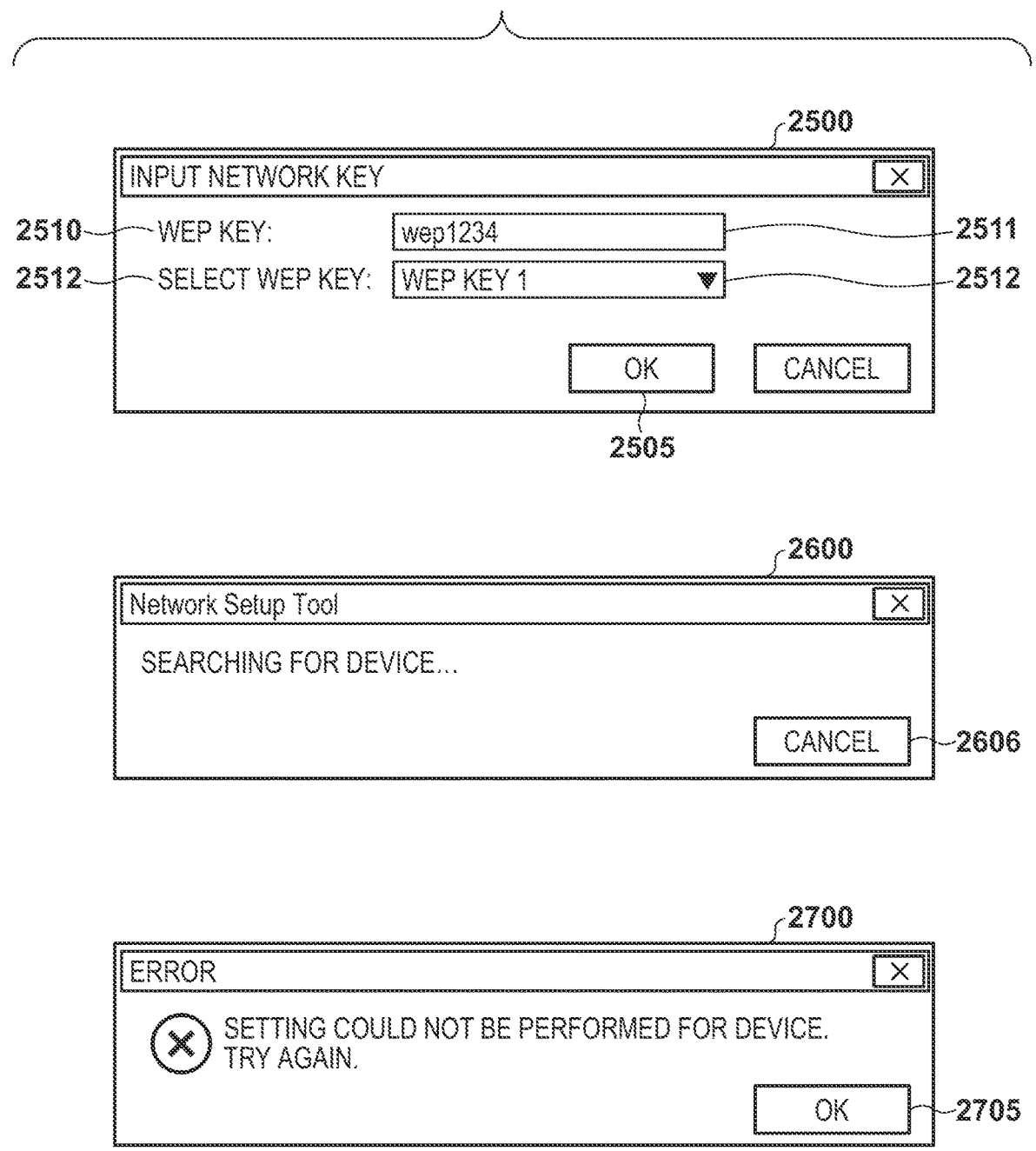
FIG. 17 is a diagram showing an example of a UI screen according to an embodiment.

A security technique that is used in the wireless LAN is specified using a setting item 1414 of the screen 1400. WPA/WPA2, WEP, and none can be selected as a pull-down menu. If WPA/WPA2 is selected, a screen 2400 in FIG. 16 is displayed. In the screen 2400, a PSK (pre-shared key) string is input in a region 2410, and an OK button 2405 is pressed such that the setting can be reflected. If WEP is selected, a screen 2500 in FIG. 17 is displayed, in which a key string for WEP is input in a region 2510, and a key number can be designated in a region 2512. When an OK button 2505 is pressed, the setting content is reflected.

Next, a case will be described in which a "select I/F" button 960 is pressed in the screen 900. If the "select I/F" button 960 is pressed, a screen 1500 in FIG. 12 that is an I/F selection screen is displayed, and an I/F that the user desires to use for setting can be selected using one of checkboxes 1510 to 1512. The screen 1500 is a display example of a device having three I/Fs. By pressing an OK button 1505, input items are checked, and, after that, the procedure advances to step S625 similarly, where the system control unit 102 temporarily holds the input setting values. More specifically, the system control unit 102 stores network parameters that have been changed. After setting values were held temporarily, the procedure advances to step S626, where, as described above, the system control unit 102 brings the setting reflection button 951 to a state of being able to be pressed, and the procedure returns to step S620, where the screen 900 is displayed. Input items are checked in step S624 because it is taken into consideration that a wired LAN and a wireless LAN (infrastructure) cannot be enabled at the same time depending on a device, for example. Control is performed such that, if a setting value that violates such prohibition is input, the input setting is determined to be an inconsistent setting, and the procedure does not advance. In addition, a screen 1520 in FIG. 12 is a screen example in the case of a device that does not physically include a wired LAN, and an I/F that is not provided in the device is not displayed. Therefore, only checkboxes 1511 and 1512 are displayed.

If it is determined in step S621 that no setting button has been pressed, the procedure advances to step S627, where the system control unit 102 determines whether or not the setting reflection button 951 has been pressed. Here, if the setting reflection button 951 has not been pressed, or if the setting reflection button 951 is not in a state of being able to be pressed, the procedure advances to step S619. In step S619, the system control unit 102 continues screen display, determines whether or not another device has been selected, and if another device has been selected, returns the procedure to step S609, and otherwise returns the procedure to step S616.

On the other hand, if it is determined in step S627 that the setting reflection button 951 has been pressed, the procedure advances to step S628, where the system control unit 102 switches network I/F settings on the information processing apparatus 101 in accordance with the peripheral apparatus (device) in which selected setting is to be performed. Subsequently, in step S629, the system control unit 102 executes setting of network parameters that have been input to the device. More specifically, setting is performed for the MIB using a SNMP protocol. A time required for setting processing changes according to the number of times setting items were changed, but if setting execution takes a long time, a screen 2300 in FIG. 16 indicating that communication is being performed is displayed to the user. In the screen 2300, as shown in FIG. 16, indication that communication with the device is being performed and a gauge indicating the degree of progress of the communication are displayed in a region 2310. After setting execution, in step S630, the system control unit 102 returns the network I/F settings on the information processing apparatus 101 to the original settings, and, in step S631, displays a result of setting execution. In the case where an error has occurred in a process of performing setting execution, error display of a screen 2700 shown in FIG. 17 is performed, and the user is prompted to perform setting again. After that, the system control unit 102 returns the procedure to step S602 as described above, performs device search in step S604, updates the peripheral apparatus list (device list), and displays the list in step S606.

The foregoing describes a main processing procedure representing a setting method of a network setting system in this embodiment, and a setting utility will be described below in detail.

Setting Utility

Figure 13:
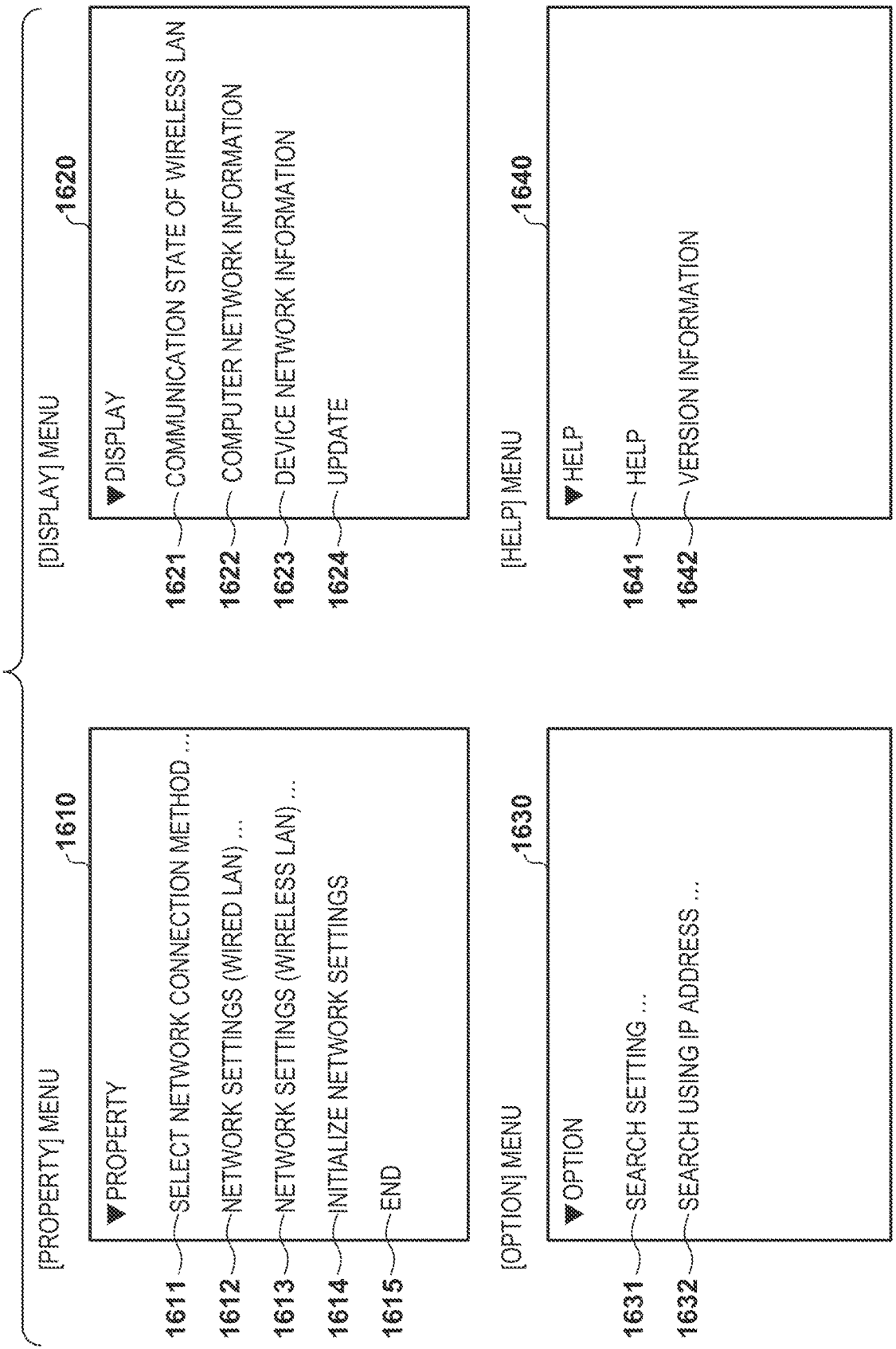
FIG. 13 is a diagram showing an example of a UI screen according to an embodiment.

The menu structure of a setting utility that runs on the information processing apparatus 101 will be described with reference to FIG. 13. When a menu button 701, 702, 703, or 704 of the screen 700 is pressed, a property menu 1610, a display menu 1620, an option menu 1630, or a help menu 1640 is respectively displayed as a pull-down menu on the screen 700.

First, the property menu 1610 will be described. A message "select network connection method . . . " is displayed in 1611. This is a shortcut menu for displaying the screen 1500 or the screen 1520 in FIG. 12. A message "network settings (wired LAN) . . . " is displayed in 1612. This is so shortcut menu for displaying the screen 1400 in FIG. 11. A message "network settings (wireless LAN) . . . " is displayed in 1613. This is a shortcut menu for displaying the screen 1300 shown in FIG. 10. A message "Initialize network settings" is displayed in 1614. This is a shortcut menu for displaying a screen 3100 shown in FIG. 18. A message for prompting the user to select whether or not to initialize the network settings of the apparatus is displayed in a region 3110. By pressing an "OK" button 3105, the network settings of the peripheral apparatus are initialized. On the other hand, when a cancel button 3106 is pressed, the network settings are not initialized, and the display screen returns to the screen 700.

The display menu 1620 will be described. A message "communication state of wireless LAN" is displayed in 1621. This is a shortcut menu for displaying a screen 1700 shown in FIG. 14. In the screen 1700, states of various types of wireless LAN communication are respectively displayed in regions 1710, 1712, and 1714. For example, as shown in FIG. 14, icons indicating the connection state, the radio wave state, and the like are displayed. By pressing update buttons 1711, 1712, and 1713, the respective wireless radio wave states can be updated. When an OK button 1705 is pressed, the display screen returns to the screen 700. A message "computer network information" is displayed in 1622. This is a shortcut menu for displaying a screen 1800 shown in FIG. 14. Display for confirming setting information related to the network interfaces on the information processing apparatus 101 in which the setting utility is executed is performed in a region 1810. By pressing a button 1806, text information is copied to a clipboard of an execution OS. When an OK button 1805 is pressed, the display screen returns to the screen 700. A message "device network information" is displayed in 1623. This is a shortcut menu for displaying the screen in order to confirm the network information of the peripheral apparatus, similar to the screen 1800. Reference numeral 1624 denotes a shortcut for updating a screen that is being displayed, and has the same function as the "update" button 705.

The option menu 1630 will be described. A message "search setting . . . " is displayed in 1631. This is a shortcut menu for displaying a screen 1900 shown in FIG. 15. The screen 1900 is a screen for inputting settings for search that are referenced when searching for a peripheral apparatus on the network. Reference numeral 1910 indicates a region for setting a time required when searching for a peripheral apparatus on the network using a multicast or broadcast, for each network I/F. Reference numeral 1912 indicates a region for setting a time-out period during which a response from the peripheral apparatus is waited for at the time of search. Reference numeral 1914 indicates a region for designating the number of routers that are passed through on the network in the case of using a multicast. When an OK button 1905 is pressed, the contents that are set in the regions 1910, 1912, and 1914 are determined, and the display screen returns to the screen 700. On the other hand, if a cancel button 1906 is pressed, the contents that have been set in the regions 1910, 1912, and 1914 are not determined, and the display screen returns to the screen 700. A message "search using IP address . . . " is displayed in 1632. This is a shortcut menu for displaying a screen 2000 shown in FIG. 15. In the case where the IP address of the device that is searched for is already known, the IP type is selected using selection button 2010 or 2012, and the IP address can be designated and input in a corresponding region 2011 or 2013. When a search button 2005 is pressed, the IP address that has been set is designated and searched for. On the other hand, when a cancel button 2006 is pressed, search is not performed with the contents that have been set, and the display screen returns to the screen 700.

The help menu 1640 will be described. Reference numeral 1641 indicates a shortcut menu for displaying a "help" screen of the setting utility itself. A message "version information" of the setting utility itself is displayed in 1642. This is a shortcut menu for displaying a screen 2100 shown in FIG. 15. The version information of the setting utility is displayed in a region 2110. When an OK button 2105 is pressed, the display screen returns to the screen 700.

Processing Procedure of Peripheral Apparatus 111

Figure 19:
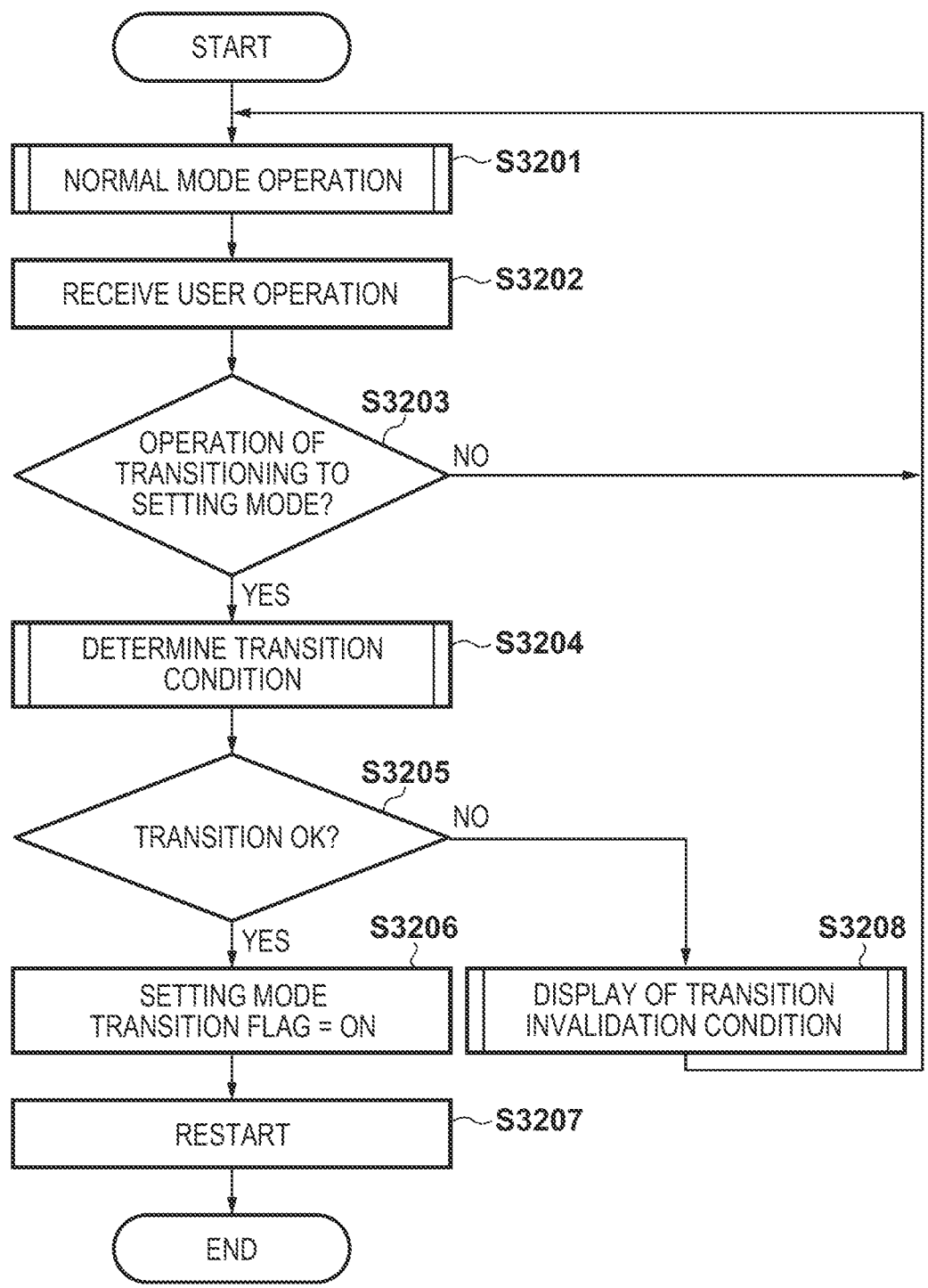
FIG. 19 is a flowchart showing a processing procedure of a peripheral apparatus according to an embodiment.
Figure 20:
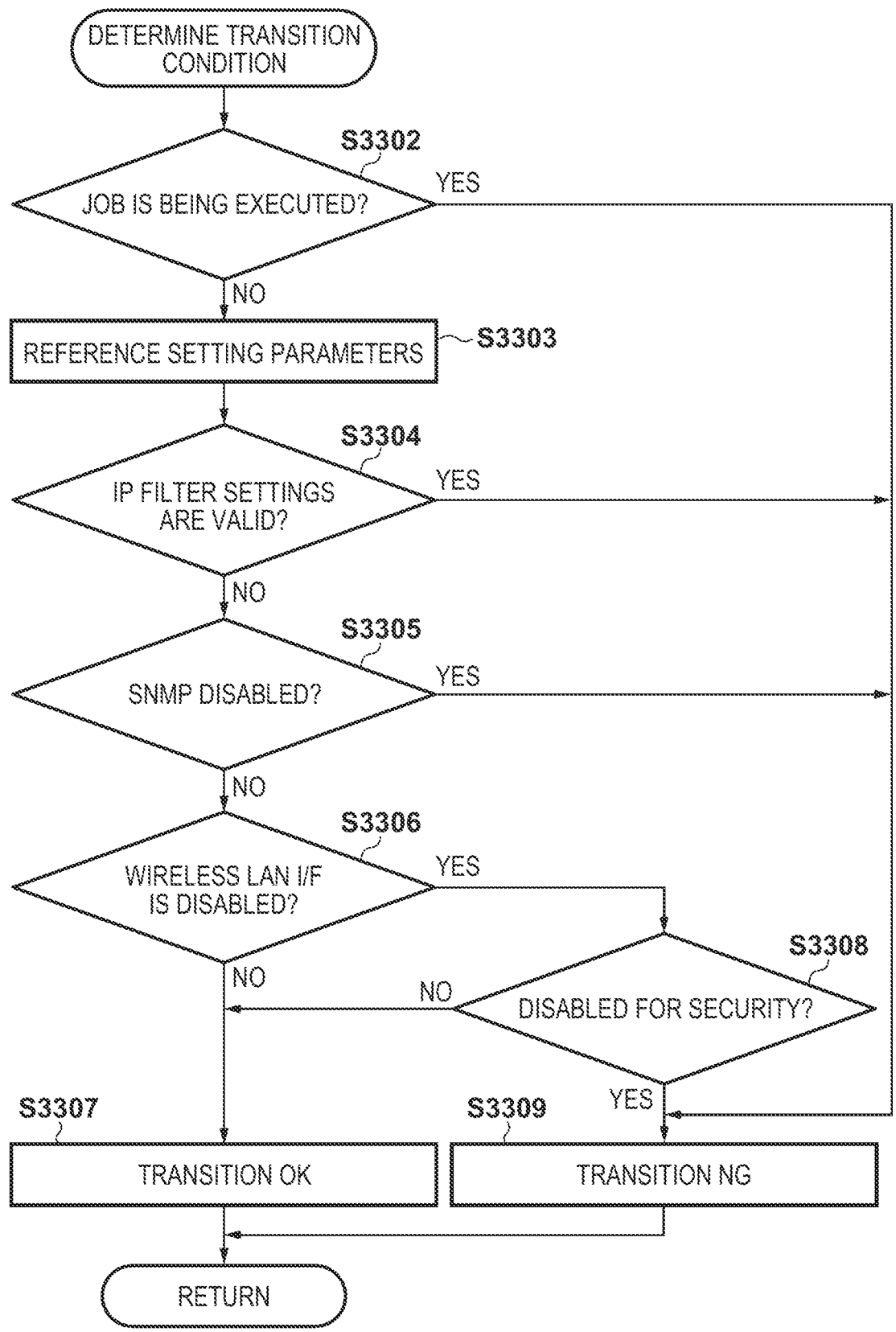
FIG. 20 is a flowchart showing a processing procedure of a peripheral apparatus according to an embodiment.

Next, a processing procedure of the peripheral apparatus 111 in this embodiment will be described with reference to FIGS. 19 and 20. Processing that is described below is achieved by the CPU in the system control unit 112 reading out a control program stored in the ROM in advance to the RAM, and executing the control program, for example. Note that processing of the peripheral apparatus 111 that is described below can be applied to any connection modes of the systems 200 to 500 described with reference to FIGS. 2 to 5.

First, the flowchart in FIG. 19 will be described. In step S3201, the peripheral apparatus 111 is operating in a normal mode. In step S3202, the system control unit 112 accepts, on the touch panel 116, a user operation including an operation on a menu for transitioning to a setting mode, for example.

In step S3203, the system control unit 112 determines whether or not an operation of transitioning to a setting mode has been performed. If a transition operation has been performed, the procedure advances to step S3204, and otherwise the operation as a normal mode is continued, and the procedure returns to step S3201. FIG. 22 shows a screen 3500 on the panel of the peripheral apparatus 111. When a start button 3521 is pressed, the system control unit 112 determines that an operation of transitioning to a setting mode has been performed. On the other hand, when a cancel button 3512 is pressed, it is not determined that an operation of transitioning to a setting mode has been performed, and the display screen is returned to the screen before the screen 3500. If it is determined in step S3203 that an instruction to transition to a setting mode was given (the start button 3521 is pressed), the procedure advances to step S3204, where the system control unit 112 determines a transition condition.

Here, a processing procedure for determining a condition for transitioning to a setting mode will be described with reference to the flowchart in FIG. 20. In step S3302, the system control unit 112 determines whether or not a job is being executed, and if a job is being executed, the procedure advances to step S3309, where the system control unit 112 sets such that the transition to a setting mode is invalidated (NG), and ends the procedure. On the other hand, if it is determined in step S3302 that a job is not being executed, the procedure advances to step S3303, where the system control unit 112 references setting parameters of network control. Subsequently, in step S3304, the system control unit 112 determines whether or not an IP filter has been set (is valid). If setting of the IP filter is valid, the procedure advances to step S3309, where the transition to a setting mode is invalidated, and the procedure ends. On the other hand, if the IP filter is not set (is invalid), the procedure advances to step S3305, where the system control unit 112 determines whether or not an operation of an SNMP protocol is disabled. If an operation of an SNMP protocol is disabled, the procedure advances to step S3309, where the transition to a setting mode is invalidated, and the procedure ends. On the other hand, if an operation of an SNMP protocol is not disabled, the procedure advances to step S3306, where the system control unit 112 determines whether or not the wireless LAN I/F is disabled. If the wireless LAN I/F is disabled, the procedure advances to step S3308, where the system control unit 112 further determines whether or not the wireless LAN I/F is disabled for security, and if that is the case, the procedure advances to step S3309, and sets such that the transition to a setting mode is invalidated. If the wireless LAN I/F is not disabled, the procedure advances to step S3307. In addition, if it is determined in step S3306 that the wireless LAN I/F is not disabled, the procedure advances to step S3307. In step S3307, the system control unit 112 sets (enables) such that the transition to a setting mode is OK, and ends the procedure. The procedure then returns from this determination processing, and advances to step S3205.

Description will be given with reference to FIG. 19 again. In step S3205, it is determined whether or not a transition to a setting mode is possible. If a transition to a setting mode is possible, the procedure advances to step S3206, and otherwise the procedure advances to step S3208. In step S3206, the system control unit 112 operates a flag so as to transition to a setting mode (changes the flag to ON). Subsequently, in step S3207, the system control unit 112 causes the peripheral apparatus 111 to restart, and ends the procedure. Panel display at the time of this restart is shown in a screen 3600 in FIG. 22. A message indicating that shutdown (restart) is being executed is displayed in a region 3621. On the other hand, in step S3208, a screen 4100 shown in FIG. 25 of a condition that a transition is not possible is displayed on the panel, and the procedure returns to step S3201. A message indicating that network connection cannot be started is displayed in a region 4111. When a back button 4101 is pressed, the procedure advances to step S3201, where the operation in a normal mode continues.

Processing for Starting Peripheral Apparatus 111

Figure 21A:
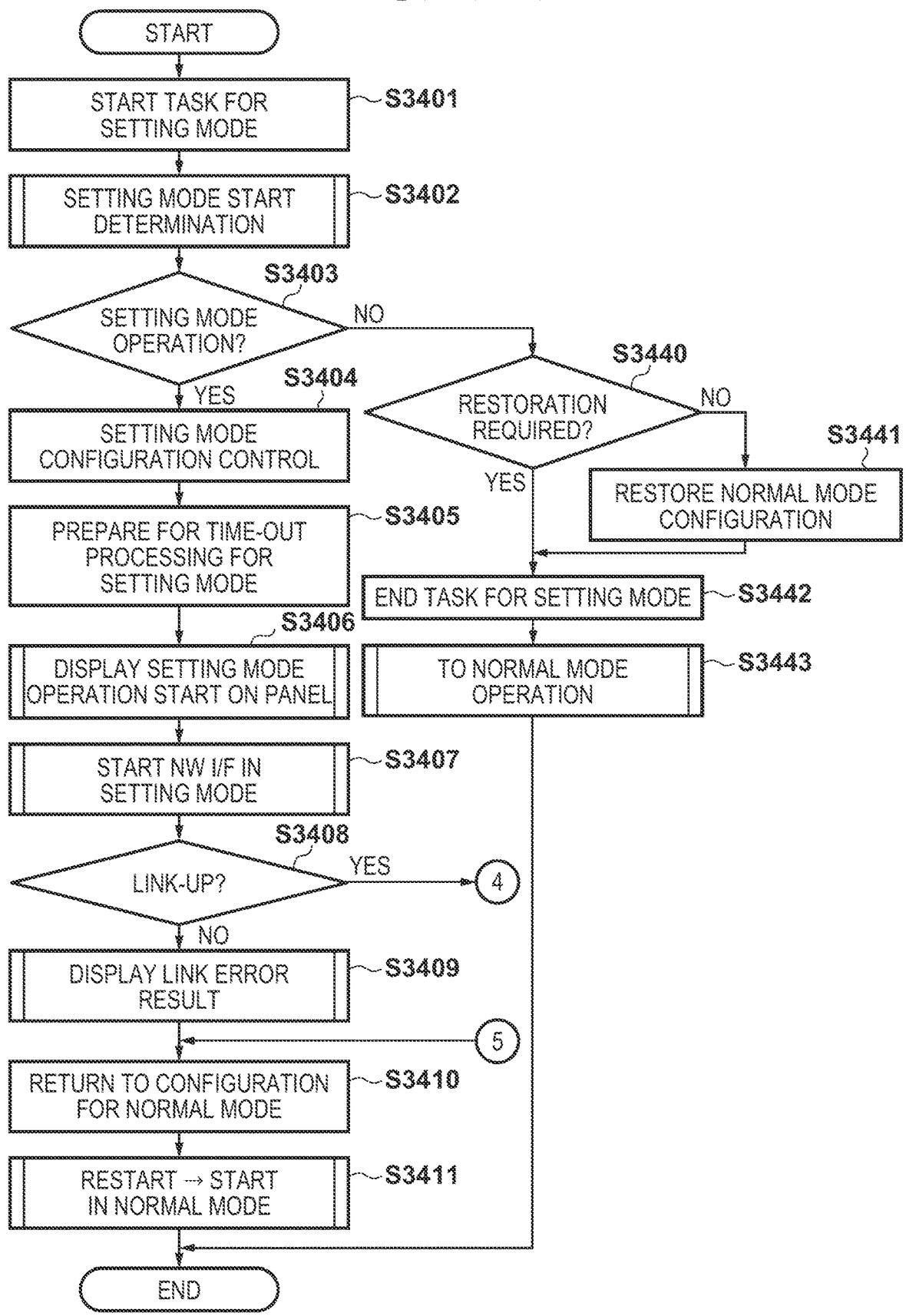
FIGS. 21A and 21B are flowcharts showing a processing procedure of a peripheral apparatus according to an embodiment.
Figure 21B:
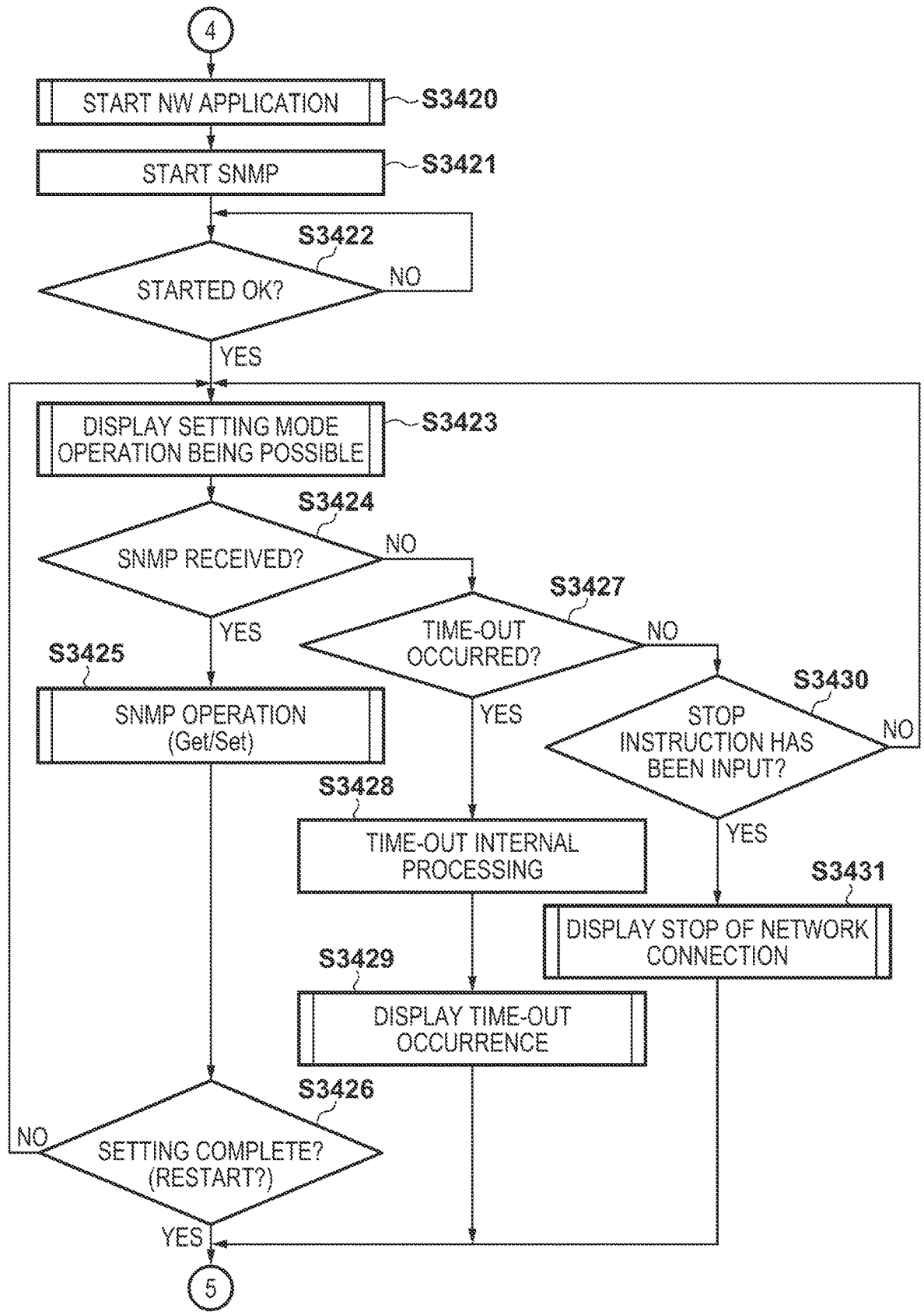

Next, a processing procedure of processing for starting the peripheral apparatus 111, the procedure being related to processing of a setting mode, will be described with reference to FIGS. 21A and 21B. Processing that is described below is achieved by the CPU in the system control unit 112 reading out a control program stored in the ROM in advance to the RAM, and executing the control program, for example. Note that processing of the peripheral apparatus 111 that is described below can be applied to any connection modes of the systems 200 to 500 described with reference to FIGS. 2 to 5.

In step S3401, the system control unit 112 starts a task for a setting mode, during processing for starting the peripheral apparatus 111. The task is started even in the case of a normal mode start. In processing in the task that has been started, the system control unit 112 determines in step S3402 whether or not the peripheral apparatus 111 is started in a setting mode. Specifically, the system control unit 112 references a flag as to whether or not the peripheral apparatus 111 is to be operated in a setting mode, and if the peripheral apparatus 111 is to be operated in a setting mode, the procedure advances to step S3404, and otherwise the procedure advances to step S3440. In step S3440 onward, processing for continuing the processing as a normal mode is performed.

In step S3404, the system control unit 112 performs configuration control as a setting mode. For example, the system control unit 112 changes an I/F that is operated for a setting mode, changes an IP address acquisition mode that is operated, and changes configuration information for starting a DHCP server for a wireless direct I/F. More specifically, in the wired LAN interface, a change is made to an operation using an IP address acquired using AutoIP. In the wireless LAN interface, startup by wireless direct connection is performed, a prescribed IP address is assigned on the interface, and a DHCP server for distributing the IP address that allows communication with the prescribed IP address is started. In addition, the system control unit 112 also stores configuration values in order to return to a previous state and perform startup when a setting mode ends suddenly or the like.

Figure 23:
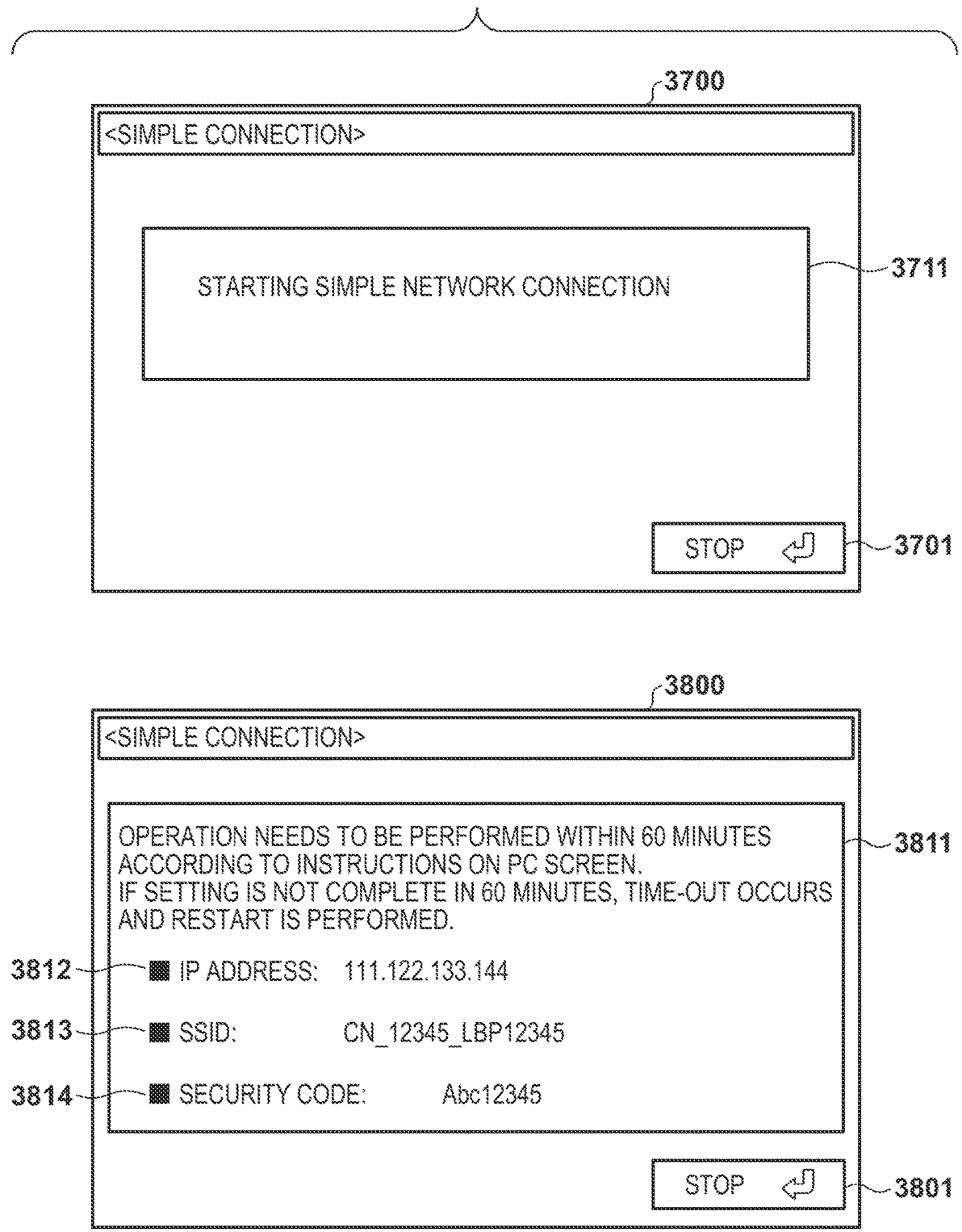
FIG. 23 is a diagram showing an example of a UI screen according to an embodiment.

Next, in step S3405, the system control unit 112 starts a timer for timing out a setting mode. This is for returning to a normal mode, as a measurement in terms of security, in the case where the peripheral apparatus 111 has been changed to a setting mode, and is left idle. Subsequently, in step S3406, the system control unit 112 displays, on the panel, a screen 3700 that is shown in FIG. 23, and indicates that startup has been performed in a setting mode. Indication that startup has been performed in a setting mode, such as a message "simple network connection is started", is displayed in a region 3711. When a stop button 3701 is pressed, the processing in a setting mode is stopped.

Next, in step S3407, the system control unit 112 reflects network interface settings exclusive for a setting mode, which are the content prepared in step S3404, and starts the network interface in a setting mode. More specifically, in the wired LAN interface, an IP address acquisition mode is set to AutoIP, and mutual communication with a device on the wired LAN is made possible. An IP address acquired using an AutoIP function makes it possible to perform mutual communication with a device physically linked-up to the same network. In the wireless LAN interface, startup is performed by a wireless soft direct function. In this interface, a wireless LAN access point function operates, and the DHCP server is enabled. Accordingly, the information processing apparatus 101 connected to the peripheral apparatus 111 by a wireless LAN direct function acquires an IP address as a DHCP client of the peripheral apparatus 111, and performs IP connection. This IP address is used, and an SNMP protocol is used. Here, a unicast communication method, a broadcast communication method, and a multicast communication method are used for searching for and setting the peripheral apparatus 111.

Next, in step S3408, the system control unit 112 determines whether or not the peripheral apparatus 111 successfully transitioned to reach link-up using the settings made in step S3407. In the wireless LAN, it is conceivable that link-up is not achieved under the influence of an external radio wave environment, and thus, in such a case, it is possible to select whether to try again, or stop without continuing the operation (restart is performed to be in a normal mode). If link-up is not achieved, the procedure advances to step S3409, where the system control unit 112 displays an error occurrence screen 4000 shown in FIG. 24. In the error occurrence screen 4000, a region 4011 in which it is indicated that startup could not be performed in a setting mode and a YES button 4012 and a NO button 4013 for selecting whether or not to perform restart are displayed. When a stop button 4001 is pressed, the system control unit 112 stops restart. After that, the procedure advances to step S3410, where the system control unit 112 uses configuration information stored in step S3404 to return to configuration for performing startup in a normal mode. The procedure then advances to step S3411, and the system control unit 112 restarts the peripheral apparatus, and ends the procedure.

On the other hand, if it is determined in step S3408 that link-up has been achieved successfully, the procedure advances to step S3420, where the system control unit 112 performs processing for initializing and starting an application that is operated on the network. Here, description will be given regarding an SNMP as the application related to a setting mode. Other applications that are not required for a setting mode are not started. In step S3421, the system control unit 112 starts an SNMP application. More specifically, the system control unit 112 references operation setting values for a setting mode according to an SNMP protocol, and reflects the setting values on the operation. As a result, an SNMP packet from an SNMP manager on the network can be received. In addition, the peripheral apparatus 111 operates as an SNMP agent that responses to the receipt. In a setting mode, both SNMP v1 and SNMP v3 protocols can be operated. When performing setting for the peripheral apparatus 111, user authentication exclusive for a setting mode is performed by using SNMP v3, providing highly safe authentication in terms of security.

In step S3422, the system control unit 112 determines whether or not the SNMP application has been started, and when the application is started and it is prepared to wait for an SNMP packet, the procedure advances to step S3423. In step S3423, the system control unit 112 displays, on the panel, a screen 3800 in FIG. 23, and displays indication 3811 that an operation as a setting mode is possible. The IP address of the wired LAN interface of the peripheral apparatus 111 is displayed in 3812, and the SSID of the wireless LAN interface is displayed in 3813. In addition, a security code used for the purpose of securing the validity of the information processing apparatus 101 to be connected is displayed in 3814. In the information processing apparatus 101, it is prompted to input this security code during communication with the peripheral apparatus 111 as necessary. This corresponds to security code input of step S611 in FIG. 6A, and a security code input screen is the screen 3000 in FIG. 18 as described already. If the same string as the security code displayed on the peripheral apparatus 111 is not input in this screen, SNMP v3 communication with the peripheral apparatus 111 cannot be established. Communication is performed between the setting utility on the information processing apparatus 101 in this state, and the peripheral apparatus 111, and the network settings are reflected ultimately.

Next, in step S3424, the system control unit 112 determines whether or not an SNMP packet has been received, and upon receiving a packet, the procedure advances to step S3425, performs a protocol operation written in the packet. More specifically, database values called MIB implemented as software in the peripheral apparatus 111 is accessed according to Get command or Set command. With a result of access to the MIB, response to the SNMP packet is performed. This is an operation as a protocol, and a description regarding an error that occurs here is omitted, but in the setting utility to which an error was returned, error display that is based on the error notification is performed as the screen 2700 shown in FIG. 17. When an OK button 2705 is pressed, the display screen is returned to the original screen. After that, in step S3426, the system control unit 112 determines whether or not completion of setting has been detected, and if it is determined that completion of setting has been detected, advances the procedure to step S3410, and after displaying a screen 2900 in FIG. 18, performs restart such that startup is performed in a normal mode next time. More specifically, due to a Set operation of an SNMP in step S3425, restart is performed by a restart command being operated. If it is not determined in step S3426 that setting is complete, the procedure returns to step S3423, and the operation of the SNMP protocol is further continued.

If it is determined in step S3424 that an SNMP packet has not been received, the procedure advances to step S3427, where the system control unit 112 determines occurrence of time-out. This refers to detection of a time-out event prepared in step S3405. This is for making a transition to a normal mode in the case where the user caused the peripheral apparatus 111 to transition to a setting mode and left idle (e.g., for an hour). In the case where time-out has been detected, the procedure advances to step S3428, where the system control unit 112 performs processing such as status change that is to be performed at the time of occurrence of time-out. Display for notifying the user of occurrence of time-out is then performed on the panel for a certain period of time, the procedure advances to step S3410, and after display of the screen 2900, restart is performed such that startup is performed in a normal mode next time.

If it is determined in step S3427 that time-out has not occurred, the procedure advances to step S3430, where the system control unit 112 determines whether or not an instruction to stop the setting mode has been given on the panel on the peripheral apparatus 111. If an instruction to stop the setting mode has been received, the procedure advances to step S3431, where the system control unit 112 displays, on the panel, that the setting mode is to be stopped, as shown in a screen 3900 in FIG. 24. If a Yes button 3912 or a stop button 3901 is pressed, the procedure advances to step S3410, and after display of the screen 2900, restart is performed such that startup is performed in a normal mode next time. If a NO button 3913 is pressed, the display screen returns to the previous screen 3800. If it is determined in step S3430 that an instruction to stop the setting mode has not been received, the procedure returns to step S3423, and the operation of the SNMP protocol further continues.

If it is determined in step S3403 that the operation is not in a setting mode, the procedure advances to step S3440, where the system control unit 112 determines whether or not there is a problem with configuration for a normal mode, in other words, whether or not restoration is required, in order to perform startup in a normal mode. In the case where a problem has occurred due to setting being performed halfway, the procedure advances to step S3441, and otherwise the procedure advances to step S3442. In step S3441, the system control unit 112 performs restoration using configuration information held for a normal mode, and the procedure advances to step S3442. In step S3442, the system control unit 112 performs control so as to end the task that has been started for a setting mode, and perform an operation for transitioning to a normal mode, and ends the procedure.

As described above, the information processing apparatus according to this embodiment performs network setting of a peripheral apparatus having a plurality of communication interfaces. The information processing apparatus is connected to the peripheral apparatus using a predetermined communication interface from among the plurality of communication interfaces, and sets the plurality of communication interfaces of the peripheral apparatus via the predetermined communication interface. An IP address used for connection at the time of these network settings is determined using AutoIP in the case where the type of the predetermined communication interface is a wired communication interface. On the other hand, in the case where the type of the predetermined communication interface is a wireless communication interface, an IP address is acquired by the peripheral apparatus being operated as a DHCP server and the information processing apparatus being operated as a DHCP client. Accordingly, according to the present invention, network setting of a peripheral apparatus having a plurality of network interfaces can be suitably performed using a predetermined network interface, and user's labor related to connection of the predetermined network interface can be reduced. In particular, in the case of performing network setting using a wired communication interface such as a wired LAN, labor of the user for setting an IP address can be omitted.

Second Embodiment

Figure 26:
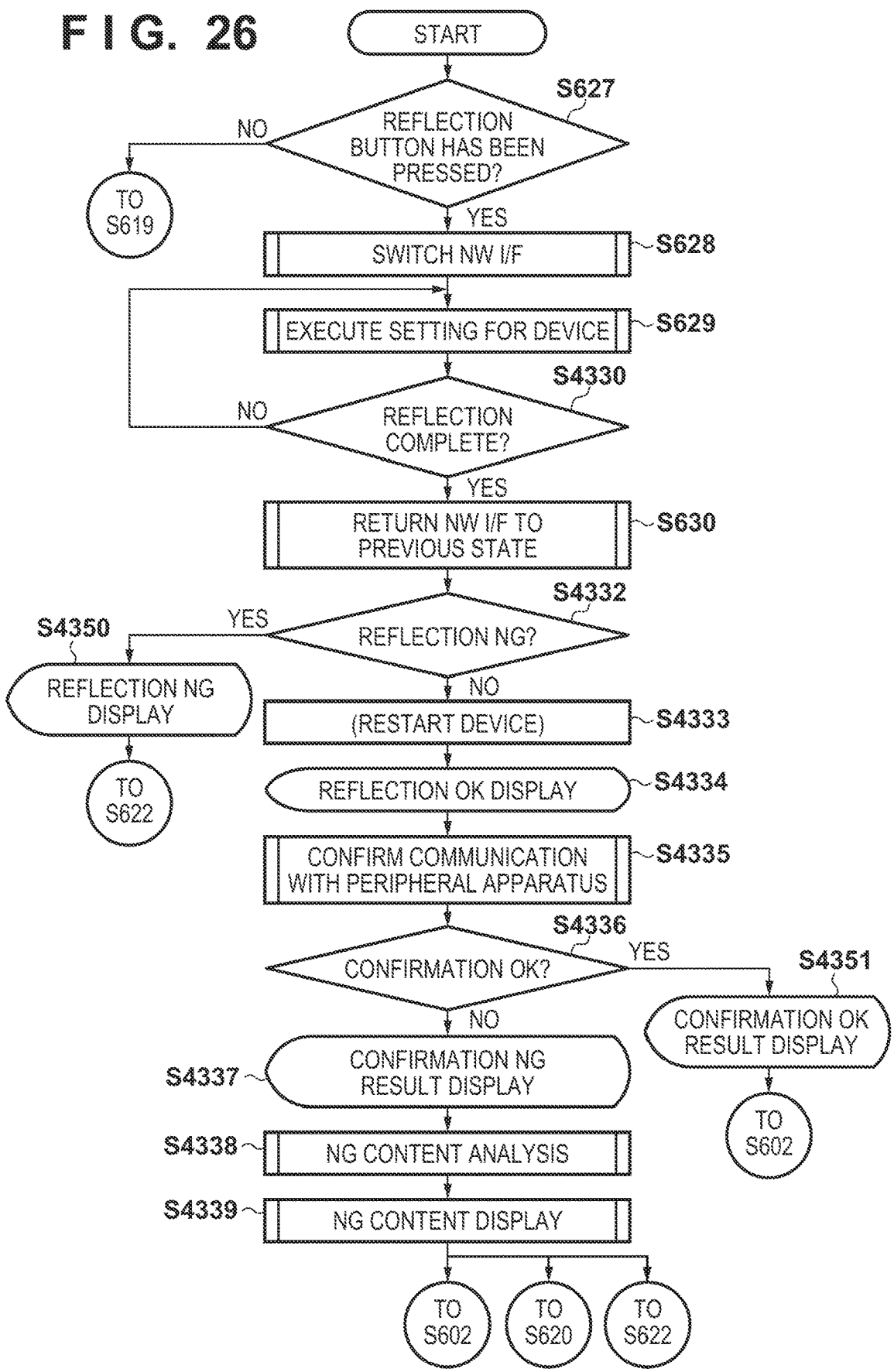
FIG. 26 is a flowchart showing a processing procedure of an information processing apparatus according to an embodiment.

A second embodiment of the present invention will be described below. A processing procedure when performing confirmation control of the information processing apparatus 101 according to this embodiment will be described with reference to FIG. 26. FIG. 26 shows confirmation control that is performed when reflecting the setting values of the network setting items on a peripheral apparatus 111 in FIG. 5. Processing that is described below is achieved by a CPU in a system control unit 102 reading out a control program stored in a ROM in advance to a RAM, and executing the control program, for example. Note that processing of an information processing apparatus 101 that is described below can be applied to any connection modes of systems 200 to 500 described with reference to FIGS. 2 to 5. In addition, the flowchart in FIG. 26 is the flowcharts in FIGS.

6A and 6B a portion of which (processing from step S627 onward) is changed. Therefore, the same step numbers are assigned to the same processing as the flowcharts in FIGS. 6A and 6B, such that a description thereof is omitted, and only different portions will be described.

Setting values are actually written to the peripheral apparatus 111 in step S629, and the system control unit 102 determines in step S4330 whether or not the settings have been reflected. When determination is complete, the system control unit 102 returns the network I/F settings on the information processing apparatus 101 to the original settings in step S630. After that, in step S4332, the system control unit 102 determines an execution result of reflection processing itself, and if the result is NG (error), the procedure advances to step S4350, and if the result is not an error, the procedure advances to step S4333. In step S4350, the system control unit 102 displays an error (reflection NG) as shown in the screen 2700 in FIG. 17, prompts the user to perform network setting again, and advances the procedure to step S622.

On the other hand, in step S4333, the system control unit 102 causes the peripheral apparatus 111 to perform restart so as to reflect the setting values on operations. Subsequently, in step S4334, a message "Setting for peripheral apparatus is complete. Confirmation is being performed" is displayed in a region 715 shown in FIG. 7A. The procedure then advances to step S4335, where the system control unit 102 confirms communication with the peripheral apparatus 111. More specifically, a waiting period is provided until network parameters that have been set are actually reflected on the peripheral apparatus 111. In step S4336, the system control unit 102 determines whether or not confirmation has been performed successfully. If reflection is recognized as a lapse of time or operation values, or if it is determined that the information processing apparatus 101 and the peripheral apparatus 111 could communicate with each other with the values that have been set, it is determined that the confirmation result is OK, and the procedure advances to step S4351. In step S4351, the system control unit 102 displays the result of communication confirmation being OK, and advances the procedure to step S602. This is a processing flow in the case where setting was successful.

On the other hand, if it is determined in step S4336 that confirmation cannot be performed, in other words, the confirmation result is NG, the procedure advances to step S4337, the result of communication confirmation being NG is displayed, and the procedure advances to step S4338. In step S4338, the system control unit 102 analyzes the NG content (error content). As the NG content, there are cases such as where a PING command fails with the IP address that has been set, and where communication is not possible even if multicast communication is performed. In addition, even if setting was performed correctly, there are cases where communication between the information processing apparatus 101 and the peripheral apparatus 111 cannot be performed successfully. After the analysis, in step S4339, the system control unit 102 determines the NG content, and the NG content that has been set in the peripheral apparatus 111 is displayed. After that, the procedure branches to steps S602, S620, and S622 according to the analysis result. For example, in the case where search on the network is performed, or the peripheral apparatus 111 that has been set is searched for, a detail setting screen of the peripheral apparatus 111 is displayed. Note that, at this time, in the case of a result of communication failure with new network setting values after the network settings of the peripheral apparatus 111 were rewritten already, display is not performed in a search result. In such a case, the peripheral apparatus is restarted, and display for prompting the user to transition to a mode for setting is further performed. After that, the procedure advances to step S602, apparatus search is performed, the peripheral apparatus list is updated, and display is performed again.

As described above, according to this embodiment, when network setting is performed, the peripheral apparatus is caused to perform communication confirmation, and the confirmation status and confirmation result are displayed. Accordingly, in the case where erroneous settings are reflected, it is possible to avoid labor when an error occurs when actually performing communication, and the user performs setting again, and to recognize erroneous setting content in advance. Furthermore, according to this embodiment, if the confirmation result is NG, the NG content is analyzed, and a more user-friendly operation scheme can be provided by performing display for setting a setting item related to the content.

Third Embodiment

Figure 27:
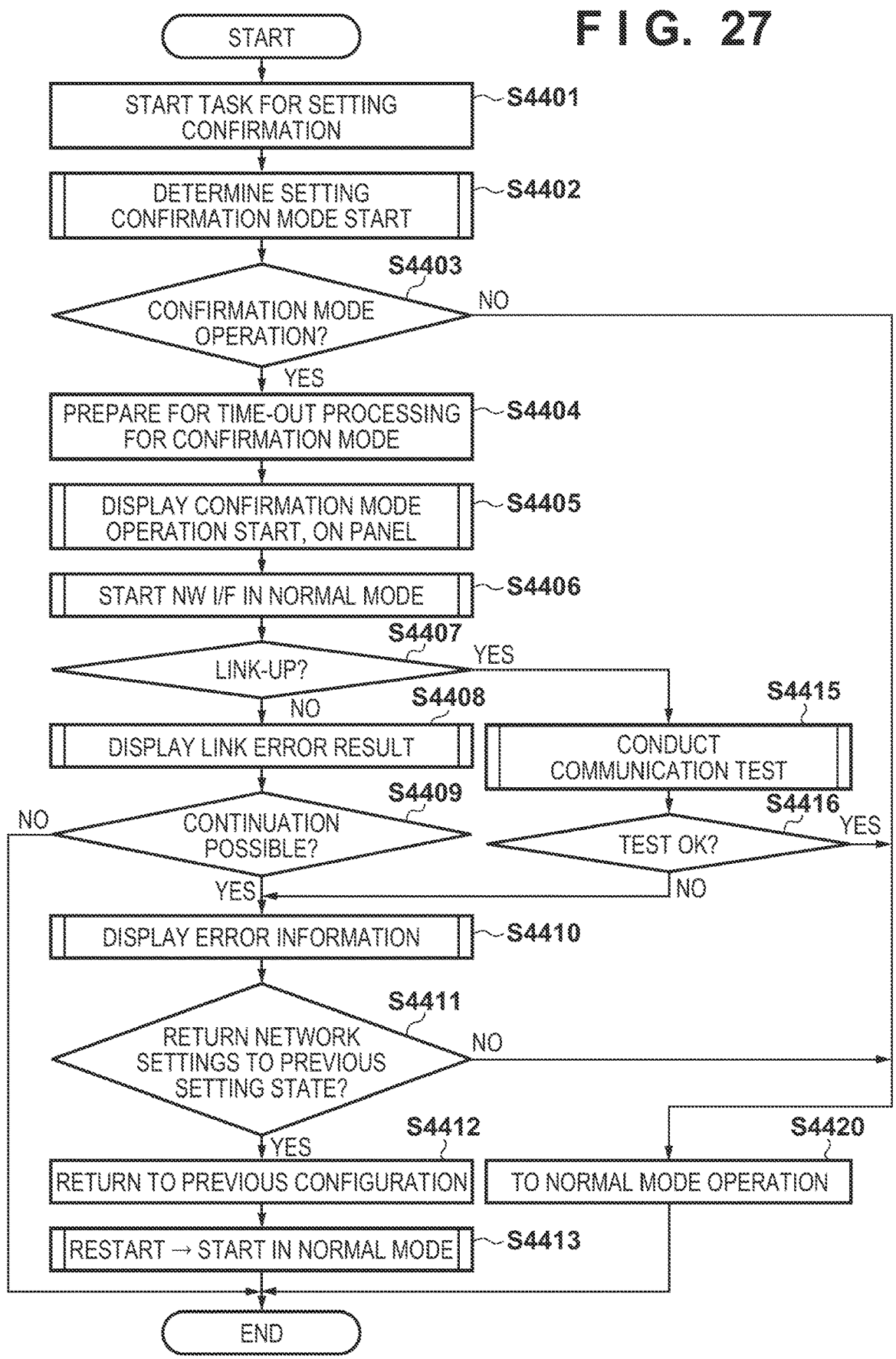
FIG. 27 is a flowchart showing a processing procedure of a peripheral apparatus according to an embodiment.

A third embodiment of the present invention will be described below. A processing procedure when performing startup processing in a peripheral apparatus 111 according to this embodiment will be described with reference to FIG. 27. The flowchart in FIG. 27 represents an outline of processing for starting the peripheral apparatus 111 and processing related to processing of a setting confirmation mode. In the setting confirmation mode, processing similar to that of a normal start mode is ultimately performed, but a change is made from previous setting values at the time of startup, a communication test is performed, and if it is determined as a result of the test that the peripheral apparatus 111 is in a disconnected state, indication as such is displayed, and resetting can be performed. In addition, processing to be described below is achieved by a CPU in a system control unit 112 reading out a control program stored in a ROM in advance to a RAM, and executing the control program, for example. Note that processing of the peripheral apparatus 111 that is described below can be applied to any connection modes of systems 200 to 500 described with reference to FIGS. 2 to 5.

In step S4401, the system control unit 112 starts a task for a setting confirmation mode during startup processing. A task for a setting mode has been described with reference to the flowcharts in FIGS. 21A and 21B, but, here, another task for a setting confirmation mode will be described. Note that a task for setting may also function as a task for setting confirmation, and in that case, the processing of the flowchart in FIG. 27 and the processing of the flowcharts in FIGS. 21A and 21B are selectively executed.

In processing in a task that has been started, in step S4402, the system control unit 112 determines whether or not to perform startup in a setting confirmation mode. Specifically, the system control unit 112 references a flag as to whether or not an operation is performed in a setting confirmation mode, and in the case where an operation is performed in a setting confirmation mode, the procedure advances to step S4404, and otherwise the procedure advances to step S4420. In step S4420, the system control unit 112 performs processing for continuing the processing in a normal mode, and ends the procedure.

On the other hand, in step S4404, the system control unit 112 starts a timer for timing out the setting confirmation mode. This is for returning to a normal mode in the case where the peripheral apparatus 111 was changed to a setting confirmation mode and is left idle. Subsequently, in step S4405, the system control unit 112 performs display indicating that startup has been performed in a setting confirmation mode, on the panel.

Figure 24:
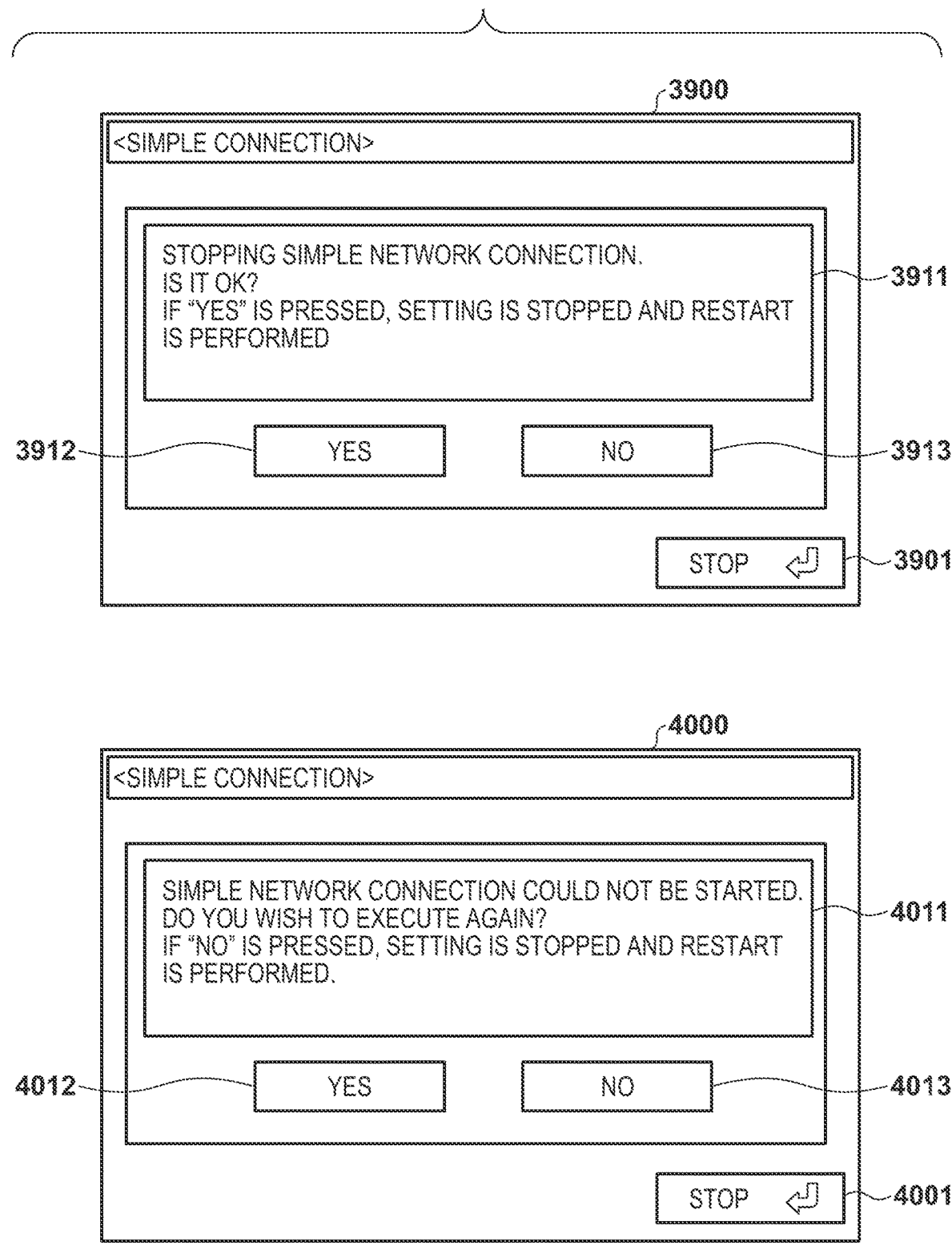
FIG. 24 is a diagram showing an example of a UI screen according to an embodiment.

Next, in step S4406, the system control unit 112 reflects network interface settings for a normal mode that have been set, and performs startup. In step S4407, the system control unit 112 determines whether or not the peripheral apparatus 111 has transitioned to reach link-up successfully with the settings. If an error occurs in link processing, the procedure advances to step S4408, where an error occurrence screen 4000 in FIG. 24 is displayed. Subsequently, the procedure advances to step S4409, where the system control unit 112 determines whether or not the operation can be continued in this error state. If the operation can be continued, the procedure advances to step S4410, where the system control unit 112 displays error occurrence detail information. On the other hand, if the operation cannot be continued, the system control unit 112 ends the operation of the peripheral apparatus 111.

After the processing of step S4410, the procedure advances to step S4411, where the system control unit 112 determines whether or not to return the network settings to the previous setting state. If the network settings are to be returned to the previous setting state, the procedure advances to step S4412, where the system control unit 112 performs setting so as to return to the network settings that are held, and advances the procedure to step S4413, where restart is performed, and the procedure is ended. As a result, startup will be performed in a normal mode next time. If the network settings are not to be returned to the previous setting state, the procedure advances to step S4420, where the system control unit 112 performs processing for continuing the processing as a normal mode, and ends the procedure.

On the other hand, it is determined in step S4407 that link-up was achieved, the procedure advances to step S4415, where the system control unit 112 performs a connectivity test using a method instructed at the time of setting or using PING to a predetermined server on the network, or the like. In step S4416, the system control unit 112 determines the test result, and if it is determined that the result is OK, determines that setting was successful, and the procedure advances to step S4420, where the system control unit 112 performs processing for continuing the processing as a normal mode, and ends the procedure. On the other hand, if it is determined that the result is NG, the procedure advances to step S4410, where the system control unit 112 displays the NG (error) content. Processing afterward has been described already.

As described above, according to this embodiment, similar to the above second embodiment, in a peripheral apparatus, communication confirmation is performed when the settings are updated, and it is possible to recognize erroneous settings and the like before actually performing communication, and to return the network settings to previous settings. In addition, if the peripheral apparatus is started in a setting confirmation mode and is left idle for a long time, a transition can be automatically made to a normal mode.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-091399 filed on May 1, 2017, which is hereby incorporated by reference herein in its entirety.

What is claimed is:

1. An information processing apparatus that performs network setting of a peripheral apparatus having a plurality of communication interfaces, the information processing apparatus comprising:
   at least one processer and at least one memory coupled to the at least one processor and having stored thereon instructions, which when executed by the at least one processor, implement:
   a connection unit that connects the information processing apparatus to the peripheral apparatus using a predetermined communication interface from among the plurality of communication interfaces of the peripheral apparatus; and
   a setting unit that performs setting of the plurality of communication interfaces of the peripheral apparatus via the predetermined communication interface,
   wherein in a case where a type of the predetermined communication interface is a wired communication interface, an IP address used when the connection unit performs connection is determined using AutoIP,
   wherein, in a case where the type of the predetermined communication interface is a wireless communication interface, an IP address is acquired by the peripheral apparatus being operated as a DHCP server, and the information processing apparatus being operated as a DHCP client, and
   wherein the information processing apparatus temporarily communicates with the peripheral apparatus using the predetermined communication interface to set the plurality of communication interfaces, and returns, after completion of the setting of the plurality of communication interfaces of the peripheral apparatus, a setting of a communication interface of the information processing apparatus from a temporary setting for using the predetermined communication interface to a previous setting set before the setting of the plurality of communication interfaces of the peripheral apparatus.

2. The information processing apparatus according to claim 1,
wherein the setting unit performs setting of the plurality of communication interfaces of the peripheral apparatus in accordance with a user input that is input via a screen displayed on a display unit.

3. The information processing apparatus according to claim 2, wherein the at least one memory has further instructions stored thereon that, when executed by the at least one processor, implement:
a confirmation unit that confirms communication with the peripheral apparatus when content of setting performed by the setting unit is reflected in the peripheral apparatus.

4. The information processing apparatus according to claim 3,
wherein the setting unit displays, on the display unit, a result of confirmation performed by the confirmation unit.

5. The information processing apparatus according to claim 4, wherein the at least one memory has further instructions stored thereon that, when executed by the at least one processor, implement:
an analysis unit that analyzes error content if the result of confirmation indicates an error,
wherein the setting unit displays, on the display unit, a screen for again performing network setting corresponding to the error content analyzed by the analysis unit.

6. A system in which an information processing apparatus performs network setting of a peripheral apparatus having a plurality of communication interfaces,
the information processing apparatus including:
at least one processer and at least one memory coupled to the at least one processor and having stored thereon instructions, which when executed by the at least one processor, implement:
a connection unit that connects the information processing apparatus to the peripheral apparatus using a predetermined communication interface from among the plurality of communication interfaces of the peripheral apparatus, and
a setting unit that performs setting of the plurality of communication interfaces of the peripheral apparatus via the predetermined communication interface, and
the peripheral apparatus including:
at least one processer and at least one memory coupled to the at least one processor and having stored thereon instructions, which when executed by the at least one processor, implement:
a starting unit that starts the peripheral apparatus in accordance with a type of the predetermined communication interface and an operation mode of the peripheral apparatus, and
a reflection unit that acquires and reflects content of setting performed by the setting unit,
wherein, in a case where the type of the predetermined communication interface is a wired communication interface, an IP address used when connection to the information processing apparatus is made is determined using AutoIP,
wherein, in a case where the type of the predetermined communication interface is a wireless communication interface, an IP address is acquired by the peripheral apparatus being operated as a DHCP server, and the information processing apparatus being operated as a DHCP client, and
wherein the information processing apparatus temporarily communicates with the peripheral apparatus using the predetermined communication interface to set the plurality of communication interfaces, and returns, after completion of the setting of the plurality of communication interfaces of the peripheral apparatus, a setting of a communication interface of the information processing apparatus from a temporary setting for using the predetermined communication interface to a previous setting set before the setting of the plurality of communication interfaces of the peripheral apparatus.

7. A control method of an information processing apparatus that performs network setting of a peripheral apparatus having a plurality of communication interfaces, the method comprising:
connecting the information processing apparatus to the peripheral apparatus using a predetermined communication interface from among the plurality of communication interfaces of the peripheral apparatus; and
performing setting of the plurality of communication interfaces of the peripheral apparatus via the predetermined communication interface,
wherein in a case where a type of the predetermined communication interface is a wired communication interface, an IP address used for connection made in the connecting is determined using AutoIP,
wherein, in a case where the type of the predetermined communication interface is a wireless communication interface, an IP address is acquired by the peripheral apparatus being operated as a DHCP server, and the information processing apparatus being operated as a DHCP client, and
wherein the information processing apparatus temporarily communicates with the peripheral apparatus using the predetermined communication interface to set the plurality of communication interfaces, and returns, after completion of the setting of the plurality of communication interfaces of the peripheral apparatus, a setting of a communication interface of the information processing apparatus from a temporary setting for using the predetermined communication interface to a previous setting set before the setting of the plurality of communication interfaces of the peripheral apparatus.

8. A control method of a system in which an information processing apparatus performs network setting of a peripheral apparatus having a plurality of communication interfaces, the method comprising:
in the information processing apparatus,
connecting the information processing apparatus to the peripheral apparatus using a predetermined communication interface from among the plurality of communication interfaces of the peripheral apparatus; and
performing setting of the plurality of communication interfaces of the peripheral apparatus via the predetermined communication interface; and
in the peripheral apparatus,
starting the peripheral apparatus in accordance with a type of the predetermined communication interface and an operation mode of the peripheral apparatus; and
reflecting setting content after acquiring the setting content as a result of the performing setting,
wherein, in a case where the type of the predetermined communication interface is a wired communication interface, an IP address used when connection to the information processing apparatus is made is determined using AutoIP, wherein, in a case where the type of the predetermined communication interface is a wireless communication interface, an IP address is acquired by the peripheral apparatus being operated as a DHCP server, and the information processing apparatus being operated as a DHCP client, and wherein the information processing apparatus temporarily communicates with the peripheral apparatus using the predetermined communication interface to set the plurality of communication interfaces, and returns, after completion of the setting of the plurality of communication interfaces of the peripheral apparatus, a setting of a communication interface of the information processing apparatus from a temporary setting for using the predetermined communication interface to a previous setting set before the setting of the plurality of communication interfaces of the peripheral apparatus.

9. A non-transitory computer-readable storage medium storing a computer program for causing a computer to execute steps of a control method of an information processing apparatus that performs network setting of a peripheral apparatus having a plurality of communication interfaces, the method comprising:

connecting the information processing apparatus to the peripheral apparatus using a predetermined communication interface from among the plurality of communication interfaces of the peripheral apparatus; and performing setting of the plurality of communication interfaces of the peripheral apparatus via the predetermined communication interface, wherein in a case where a type of the predetermined communication interface is a wired communication interface, an IP address used for connection made in the connecting is determined using AutoIP, wherein, in a case where the type of the predetermined communication interface is a wireless communication interface, an IP address is acquired by the peripheral apparatus being operated as a DHCP server, and the information processing apparatus being operated as a DHCP client, and wherein the information processing apparatus temporarily communicates with the peripheral apparatus using the predetermined communication interface to set the plurality of communication interfaces, and returns, after completion of the setting of the plurality of communication interfaces of the peripheral apparatus, a setting of a communication interface of the information processing apparatus from a temporary setting for using the predetermined communication interface to a previous setting set before the setting of the plurality of communication interfaces of the peripheral apparatus.

* * * * *